US012645048B2

(12) United States Patent
Chen et al.

(10) Patent No.: US 12,645,048 B2
(45) Date of Patent: Jun. 2, 2026

(54) IMAGING LENS MODULE, CAMERA MODULE AND ELECTRONIC DEVICE

(71) Applicant: LARGAN PRECISION CO., LTD., Taichung City (TW)

(72) Inventors: Hao Jan Chen, Taichung City (TW); Heng Yi Su, Taichung City (TW); Ming-Ta Chou, Taichung City (TW); Te-Sheng Tseng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 714 days.

(21) Appl. No.: 18/095,264

(22) Filed: Jan. 10, 2023

(65) Prior Publication Data

US 2024/0094497 A1 Mar. 21, 2024

(30) Foreign Application Priority Data

Sep. 16, 2022 (TW) .................................. 111135044

(51) Int. Cl.
*G02B 7/02* (2021.01)
*G02B 5/00* (2006.01)

(52) U.S. Cl.
CPC ............. *G02B 7/021* (2013.01); *G02B 5/005* (2013.01)

(58) Field of Classification Search
CPC . G02B 5/005; G02B 7/08; G02B 7/09; G02B 7/04; G02B 7/021; H04N 23/55; H04N 23/57; H04N 23/54; G03B 9/06; G03B 13/34; G03B 7/085; G03B 9/02; H04M 1/0264
See application file for complete search history.

(56) References Cited

U.S. PATENT DOCUMENTS

| 9,380,212 | B2 | 6/2016 | Ahn |
| 10,444,599 | B2 | 10/2019 | Park et al. |
| 10,506,146 | B2 | 12/2019 | Seo et al. |
| | | (Continued) | |

FOREIGN PATENT DOCUMENTS

| CN | 108696677 | A | 10/2018 |
| CN | 108933886 | A | 12/2018 |
| | | (Continued) | |

OTHER PUBLICATIONS

European Search Report issued in corresponding application No. 23150645.2, dated Aug. 25, 2023.

*Primary Examiner* — Ephrem Z Mebrahtu

(74) *Attorney, Agent, or Firm* — Maschoff Brennan

(57) ABSTRACT

An imaging lens module includes a casing, an imaging lens disposed to the casing, a lens carrier supporting the image lens, an elastic element connected to the lens carrier to provide the lens carrier with a translational degree of freedom along an optical axis, a frame connected to the elastic element such that the lens carrier is movable along the optical axis with respect to the frame, a variable through hole module coupled to the imaging lens and having a light passable hole with a variable aperture size, and a wiring assembly including a fixed wiring part at least partially located closer to the opening than the elastic element and a movable wiring part electrically connected to the fixed wiring part and the variable through hole module. The optical axis passes through lens elements of the imaging lens and the center of the variable through hole module.

29 Claims, 31 Drawing Sheets

(56)　　　　　　References Cited

U.S. PATENT DOCUMENTS

| | | |
|---|---|---|
| 10,571,648 B2 | 2/2020 | Lee |
| 10,645,262 B2 | 5/2020 | Oh et al. |
| 10,721,417 B2 | 7/2020 | Ha et al. |
| 10,812,692 B2 | 10/2020 | Kim |
| 10,848,656 B2 | 11/2020 | Park et al. |
| 10,852,623 B2 | 12/2020 | Kim et al. |
| 10,931,857 B2 | 2/2021 | Jun |
| 10,969,653 B2 | 4/2021 | Kim et al. |
| 2021/0109421 A1 | 4/2021 | Yu |
| 2022/0221734 A1 | 7/2022 | Kim et al. |
| 2022/0390813 A1* | 12/2022 | Lee .................... H02K 41/0354 |

FOREIGN PATENT DOCUMENTS

| | | |
|---|---|---|
| CN | 109413306 A | 3/2019 |
| CN | 109765671 A | 5/2019 |
| CN | 110579925 A | 12/2019 |
| CN | 110727159 A | 1/2020 |
| CN | 110737146 A | 1/2020 |
| CN | 110858870 A | 3/2020 |
| JP | 2007248642 A | 9/2007 |
| JP | 2016061877 A | 4/2016 |
| KR | 10-2018-0092206 A | 8/2018 |
| KR | 10-2018-0105970 A | 10/2018 |
| WO | 2021/164519 A1 | 8/2021 |

* cited by examiner

1

IMAGING LENS MODULE, CAMERA MODULE AND ELECTRONIC DEVICE

RELATED APPLICATIONS

This application claims priority to Taiwan Application 111135044, filed on Sep. 16, 2022, which is incorporated by reference herein in its entirety.

BACKGROUND

Technical Field

The present disclosure relates to an imaging lens module, a camera module and an electronic device, more particularly to an imaging lens module and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture assembly can be used to change the depth of field for adjusting the blur degree of the background and controlling the amount of incident light, such that arranging a variable aperture assembly in an optical system of an electronic device becomes a forward-looking subject. However, the conventional variable aperture assembly may have bad signal transmission because its electrical connection may be easily affected by the focus movement of the optical system, thereby having bad control in incident light amount and therefore generating unexpected imaging effect. Therefore, how to improve the electrical connection of a variable aperture module for meeting the requirement of high-end-specification electronic devices is an important topic in this field nowadays.

SUMMARY

According to one aspect of the present disclosure, an imaging lens module has an optical axis and includes a casing, an imaging lens, a lens carrier, an elastic element, a frame, a variable through hole module, and a wiring assembly. The casing has an opening. The imaging lens is disposed to the casing. Part of the imaging lens is exposed by the opening of the casing. The imaging lens includes a plurality of optical lens elements, and the optical axis passes through the plurality of optical lens elements. The lens carrier supports the imaging lens. The elastic element is connected to the lens carrier to provide the lens carrier with a translational degree of freedom along a direction parallel to the optical axis. The frame is connected to the elastic element, such that the lens carrier is movable along the direction parallel to the optical axis with respect to the frame. The variable through hole module is coupled to the imaging lens. The optical axis passes through a center of the variable through hole module. The variable through hole module has a light passable hole, and the light passable hole has a variable aperture size. The wiring assembly is electrically connected to the variable through hole module. The wiring assembly includes a fixed wiring part and a movable wiring part. The fixed wiring part is at least partially located closer to the opening of the casing than the elastic element. The movable wiring part is electrically connected to the fixed wiring part and the variable through hole module.

When a maximum height of the wiring assembly along a direction parallel to the optical axis is Hw, and a maximum height of the casing along a direction parallel to the optical axis is Hc, the following condition is satisfied: $Hw \geq Hc$.

According to another aspect of the present disclosure, an imaging lens module has an optical axis and includes a casing, an imaging lens, a lens carrier, an elastic element, a frame, a variable through hole module, and a wiring assembly. The casing has an opening. The imaging lens is disposed to the casing. Part of the imaging lens is exposed by the opening of the casing. The imaging lens includes a plurality of optical lens elements, and the optical axis passes through the plurality of optical lens elements. The lens carrier supports the imaging lens. The elastic element is connected to the lens carrier to provide the lens carrier with a translational degree of freedom along a direction parallel to the optical axis. The frame is connected to the elastic element, such that the lens carrier is movable along the direction parallel to the optical axis with respect to the frame. The variable through hole module is coupled to the imaging lens. The optical axis passes through a center of the variable through hole module. The variable through hole module has a light passable hole, and the light passable hole has a variable aperture size. The wiring assembly is electrically connected to the variable through hole module. The wiring assembly includes a fixed wiring part and a movable wiring part. The fixed wiring part is at least partially located closer to the opening of the casing than the elastic element. The movable wiring part is electrically connected to the fixed wiring part and the variable through hole module.

When a maximum height of the wiring assembly along a direction parallel to the optical axis is Hw, and a maximum height of the casing along a direction parallel to the optical axis is Hc, the following condition is satisfied: $Hw < Hc$.

According to another aspect of the present disclosure, a camera module includes one of the aforementioned imaging lens modules.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
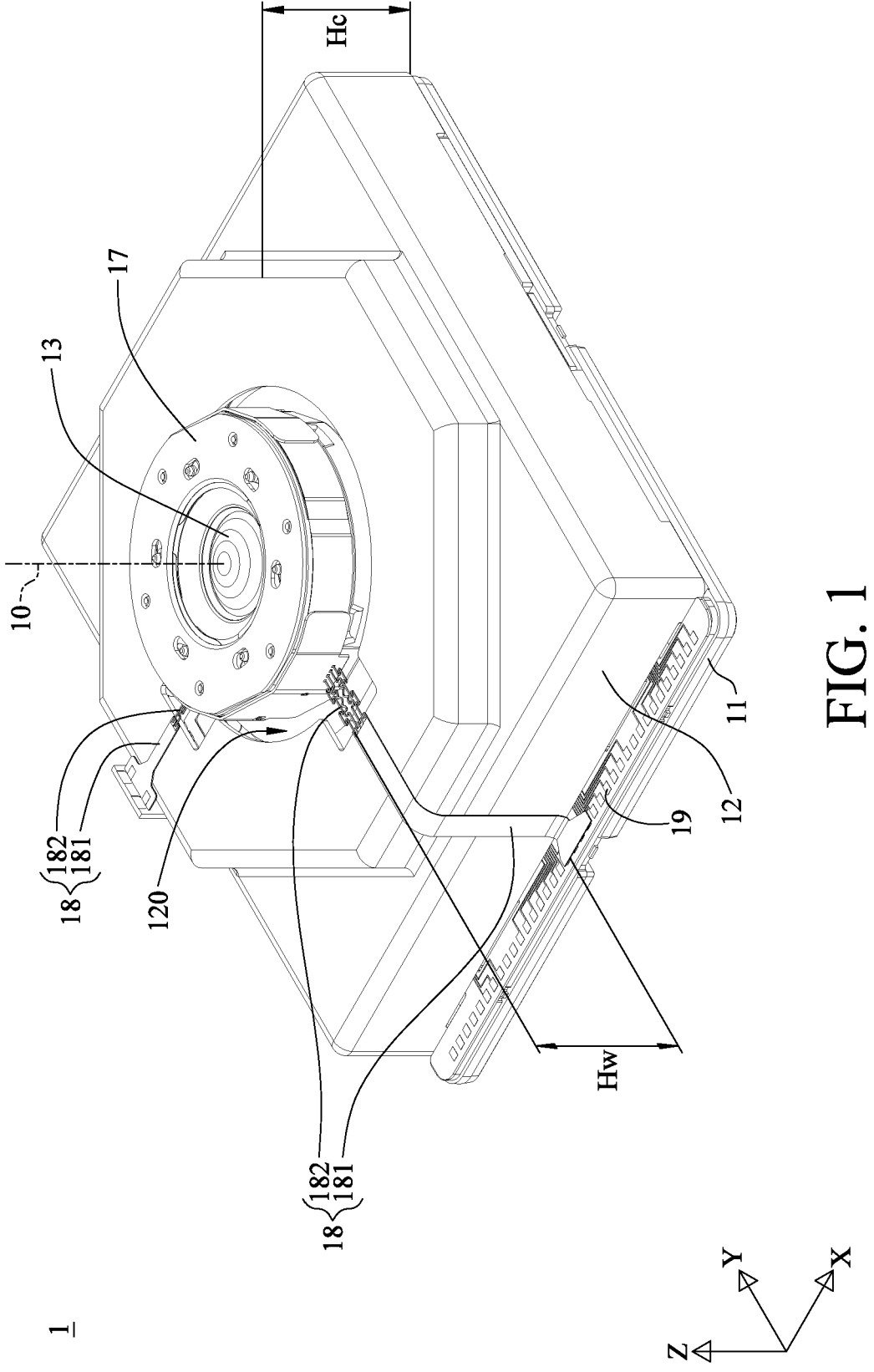
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module that has an optical axis and can include a base, a casing, an imaging lens, a lens carrier, an elastic element, a frame, a variable through hole module and a wiring assembly.

The casing can be coupled to the base to form an accommodation space therebetween. The casing has an opening to exposing the accommodation space.

The imaging lens is disposed to the casing, and part of the imaging lens is exposed by the opening of the casing. Specifically, the imaging lens can have a part disposed in the accommodation space and the other part exposed by the opening of the casing. The imaging lens includes a plurality of optical lens elements, and the optical axis passes through the optical lens elements.

The lens carrier supports the imaging lens. The elastic element has flexibility. The elastic element is connected to the lens carrier to provide the lens carrier with a translational degree of freedom along a direction parallel to the optical axis. The frame is connected to the elastic element, such that the lens carrier is movable along the direction parallel to the optical axis with respect to the frame. In detail, there may be a group of focus driving magnets disposed on the frame and a group of focus driving coils disposed on the lens carrier, such that an interaction force generated therebetween is applied to the lens carrier to move the lens carrier together with the imaging lens along a direction parallel to the optical axis, and the elastic element is able to provide the lens carrier with a restoring force to return the lens carrier together with the imaging lens to its original position. However, the present disclosure is not limited thereto.

The variable through hole module is coupled to the imaging lens, and the optical axis passes through the center of the variable through hole module. The variable through hole module has a light passable hole, and the light passable hole has a variable aperture size.

The wiring assembly is electrically connected to the variable through hole module. The wiring assembly can be made of polyimide (PI) with copper foil or copper alloy wire doped with about 1% titanium, polyimide with a conductive layer of a photoresist process, or polyimide with at least one silver-plated copper wire, but the present disclosure is not limited thereto. Moreover, when a maximum height of the wiring assembly along a direction parallel to the optical axis is Hw, and a maximum height of the casing along a direction parallel to the optical axis is Hc, the following condition can be satisfied: Hw≥Hc. Alternatively, the following condition can be satisfied in other embodiments: Hw<Hc. Please refer to FIG. 1, which shows Hw and Hc according to the 1st embodiment of the present disclosure. Moreover, when the imaging lens module is observed along a direction from an object side of the imaging lens to an image side of the imaging lens, the wiring assembly can be exposed by the casing, and whole of the elastic element can be covered by the casing.

Specifically, the wiring assembly includes a fixed wiring part and a movable wiring part. The fixed wiring part at least partially located closer to the opening of the casing than the elastic element. The movable wiring part has flexibility. The movable wiring part is electrically connected to the fixed wiring part and the variable through hole module. Moreover, the electrical connection between the movable wiring part and the fixed wiring part as well as the variable through hole module can be achieved by conductive adhesive or welding. However, the present disclosure is not limited thereto.

With the arrangement of the movable wiring part with required flexibility, the wiring assembly can have a translational degree of freedom along a direction parallel to the optical axis, which corresponds to the displacement of the imaging lens when auto-focusing. Therefore, it is favorable for properly controlling the variable aperture size of the light passable hole under the premise that the electrical connection between the wiring assembly and the variable through hole module is not affected during the auto-focusing displacement of the imaging lens, thereby ensuring the variable through hole module to provide suitable imaging effect.

Further, the variable through hole module can have a first electrical connection terminal, and the fixed wiring part can have a second electrical connection terminal. Moreover, the first electrical connection terminal and the second electrical connection terminal can be orthogonal to each other. Therefore, it is favorable for arranging the movable wiring part to be easily electrically connected to the variable through hole module and the fixed wiring part, thereby increasing assembly efficiency.

The structure of the variable through hole module is described in detail hereinafter. The variable through hole module can include a light-blocking blade assembly, a fixed element, a movable element, a rollable supporter and a driving mechanism.

The light-blocking blade assembly can be made of plastic material. Therefore, it is favorable for increasing the manufacturing efficiency of the light-blocking blade assembly. Moreover, the plastic material may be polyethylene terephthalate (PET) coated with a light-blocking layer, or PET that is sandblasted and then coated with an anti-reflection layer, but the present disclosure is not limited thereto. Moreover, the light-blocking blade assembly can include at least two light-blocking blades that can be arranged along a circumferential direction surrounding the optical axis and at least partially overlap with each other so as to form the abovementioned light passable hole. Moreover, the imaging lens and the variable through hole module can have no relative displacement with respect to each other. Therefore, it is favorable for ensuring the light-blocking position of the light-blocking blade assembly is not displaced due to the auto-focus of the imaging lens module, thereby meeting original optical designed specifications.

The fixed element can be coupled to the imaging lens and can have a first guide structure. The movable element can be connected to the light-blocking blade assembly and can have a second guide structure. The rollable supporter can be disposed between the fixed element and the movable element to provide the movable element with a rotational degree of freedom along the circumferential direction surrounding the optical axis. Therefore, it is favorable for rotating the movable element to adjust the variable aperture size of the light passable hole. Moreover, the rollable supporter can be in physical contact with the first guide structure and the second guide structure. By utilizing the arrangement of the first guide structure and the second guide structure to form a fixed track space therebetween, the rollable supporter is able to be rolled along the fixed track space for achieving dynamic matching between the fixed element and the movable element. Therefore, it is favorable for having a dynamic alignment function of the variable through hole module, thereby preventing offset in the radial positioning between the fixed element and the movable element during the operation of the variable through hole module. Moreover, the number of the rollable supporter can be five or less. Therefore, it is favorable for perverting rotation resistance generated due to an uneven surface formed by connection lines between contact points of the rollable supporters caused by manufacturing errors between the rollable supporters, thereby increasing product yield rate.

Each rollable supporter can have a plurality of contact points. The contact points can have an inner contact point, an outer contact point, an upper contact point and a lower contact point. The inner contact point can be located closer to the optical axis than the other contact points. The outer contact point can be located farther away from the optical axis than the other contact points. The upper contact point can be one of two contact points that are most spaced apart from each other in a direction parallel to the optical axis among all contact points. The lower contact point can be the other one of the two contact points that are most spaced apart from each other in the direction parallel to the optical axis among all contact points. By arranging the contact points at proper positions of the rollable supporters, it is favorable for utilizing the radial and axial balanced forces to align the fixed element and the movable element with each other. It can be said that through the design of different positions of the contact points, it is favorable for enjoying precise radial positioning and axial supporting between the fixed element and the movable element, thereby increasing operation quality of the variable through hole module. Specifically, the inner contact point and the outer contact point help the radial alignment between the fixed element and the movable element, and the upper contact point and the lower contact point help the axial alignment between the fixed element and the movable element. Moreover, the number of all contact points can be four. Alternatively, the number of the contact points can be three in total. When a total of three contact points are presented, one of the inner contact point and the outer contact point and one of the upper contact point and the lower contact point among all contact points can be the same contact point.

When a distance perpendicular to the optical axis between the inner contact point and the lower contact point among all contact points is Di, and a distance perpendicular to the optical axis between the inner contact point and the outer contact point among all contact points is Dt, the following condition can be satisfied: $0.3 \leq Di/Dt \leq 0.9$. Therefore, it is favorable for allowing the rollable supporters to achieve force balance so as to further increase operation stability of the variable through hole module. Please refer to FIG. 13, which shows Di and Dt in the first configuration according to the 1st embodiment of the present disclosure.

The driving mechanism is able to rotate the movable element along the abovementioned circumferential direction and to drive the light-blocking blade assembly for adjusting the variable aperture size of the light passable hole. Therefore, it is favorable for corresponding to various incident light amounts required in various scenarios, thereby increasing image quality.

Moreover, the imaging lens module can further include an electrical connection element and an image sensor. The electrical connection element can be disposed corresponding to the base, and the image sensor can be disposed at the image side of the imaging lens and can be electrically connected to the electrical connection element. Therefore, it is favorable for converting imaging optical signals received from the imaging lens into imaging electrical signals to be output. Moreover, the electrical connection element can be electrically connected to the wiring assembly. Therefore, it is favorable for simplifying the overall electrical connection wiring of the imaging lens module.

The present disclosure also provides a camera module that includes the abovementioned imaging lens module.

The present disclosure also provides an electronic device that includes the abovementioned camera module.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
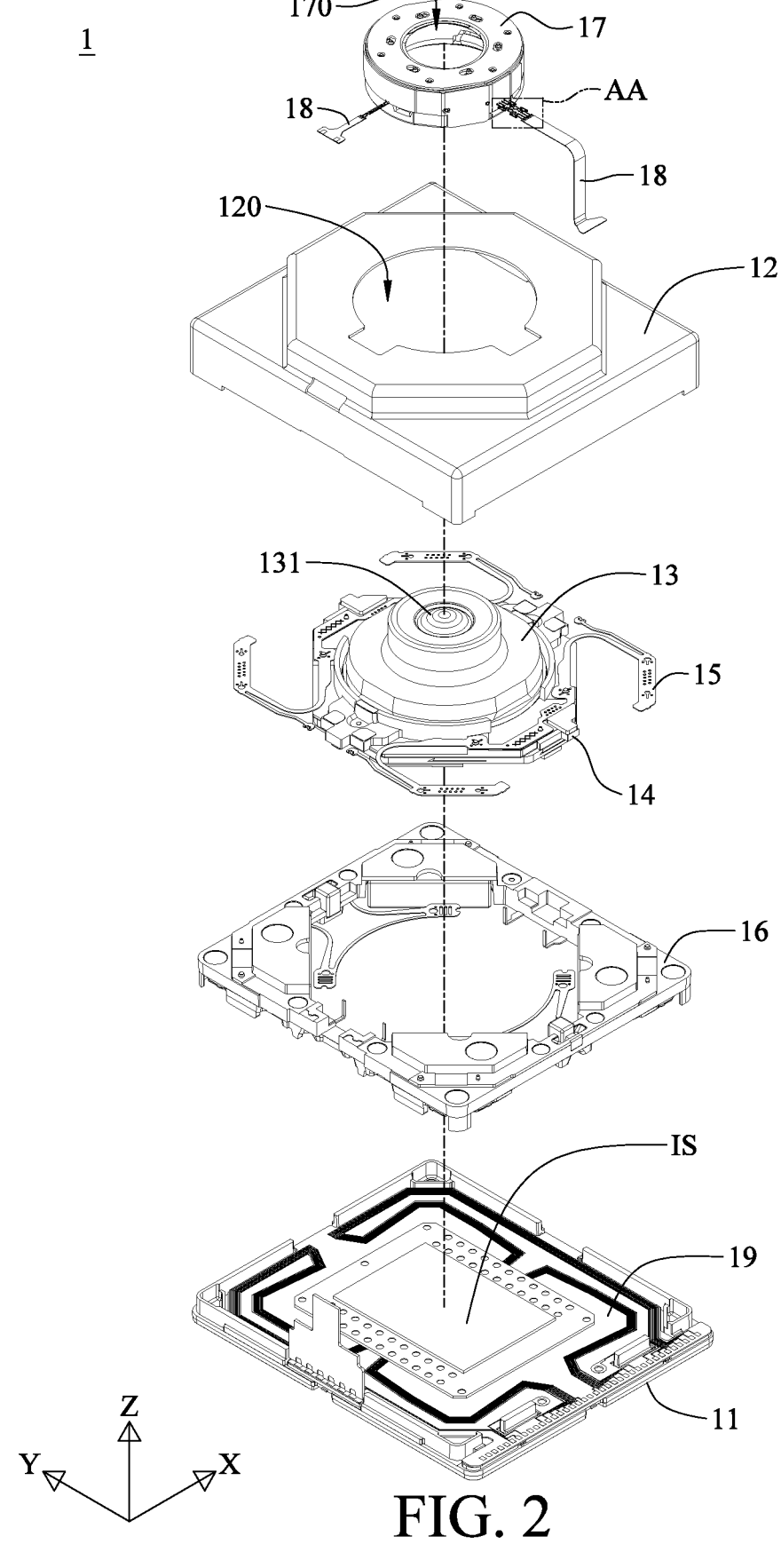
FIG. 2 is an exploded view of the imaging lens module in FIG. 1.
Figure 3:
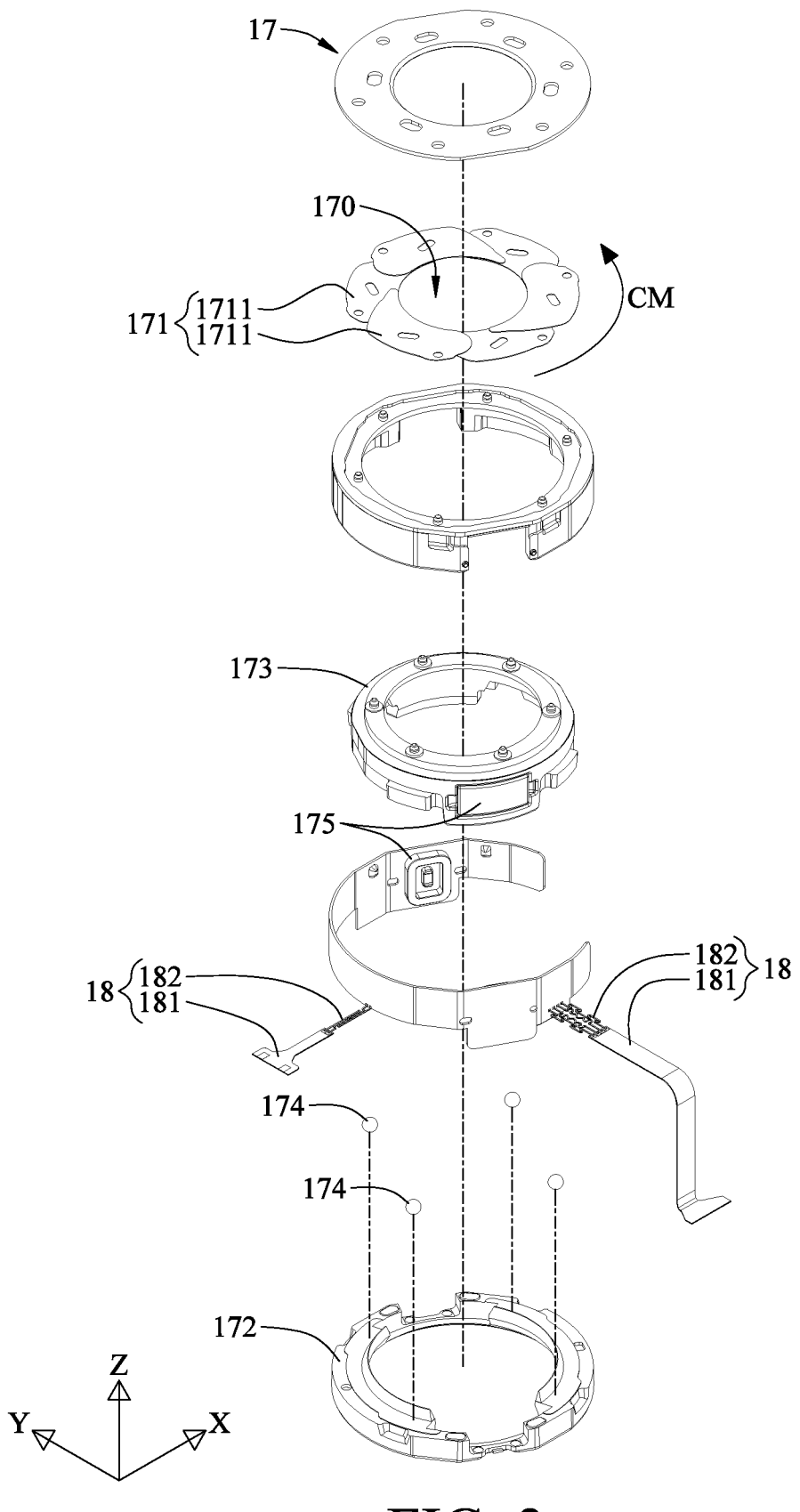
FIG. 3 is an exploded view of a variable through hole module and a wiring assembly of the imaging lens module in FIG. 2.
Figure 4:
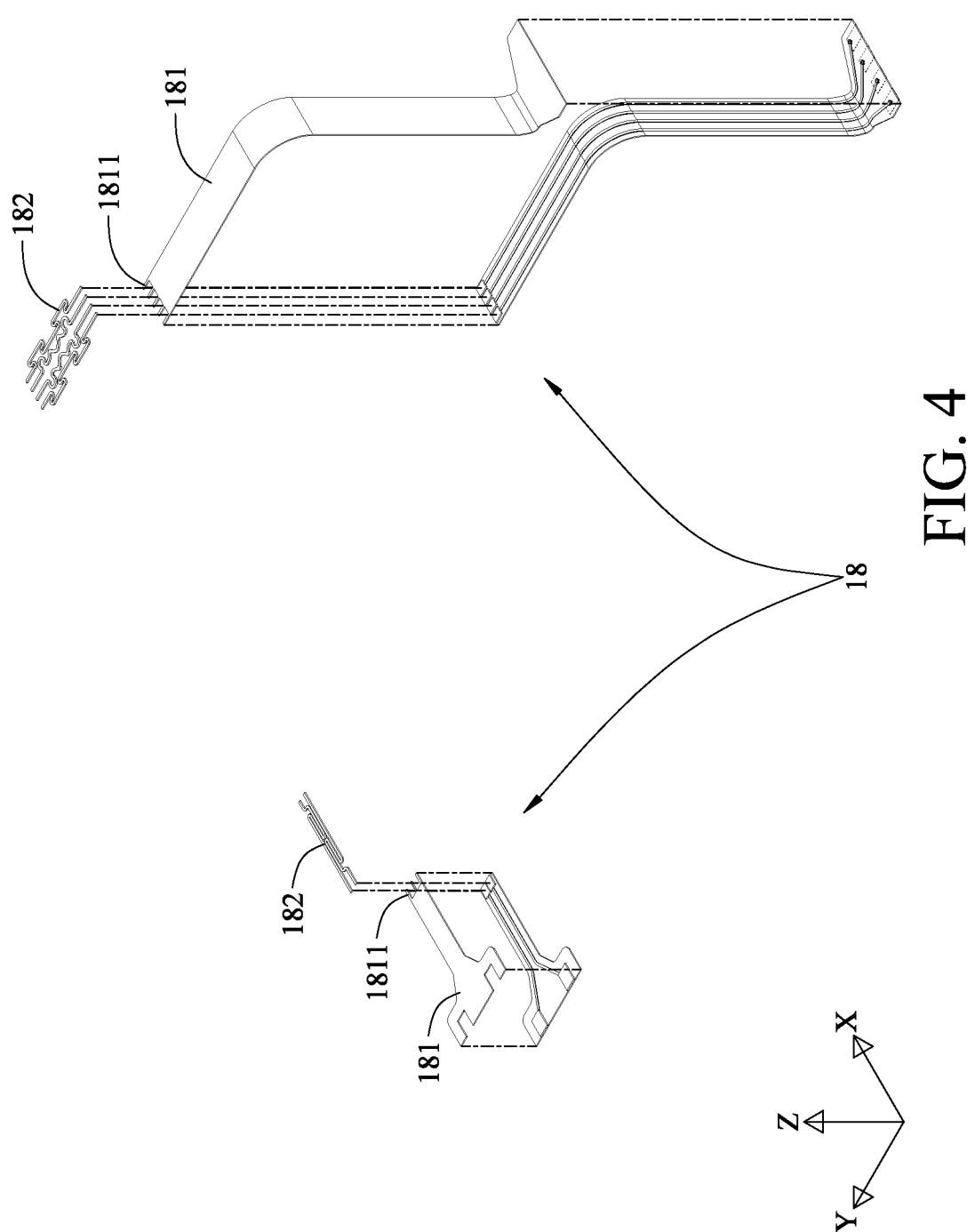
FIG. 4 is an exploded view of the wiring assembly in FIG. 3.
Figure 5:
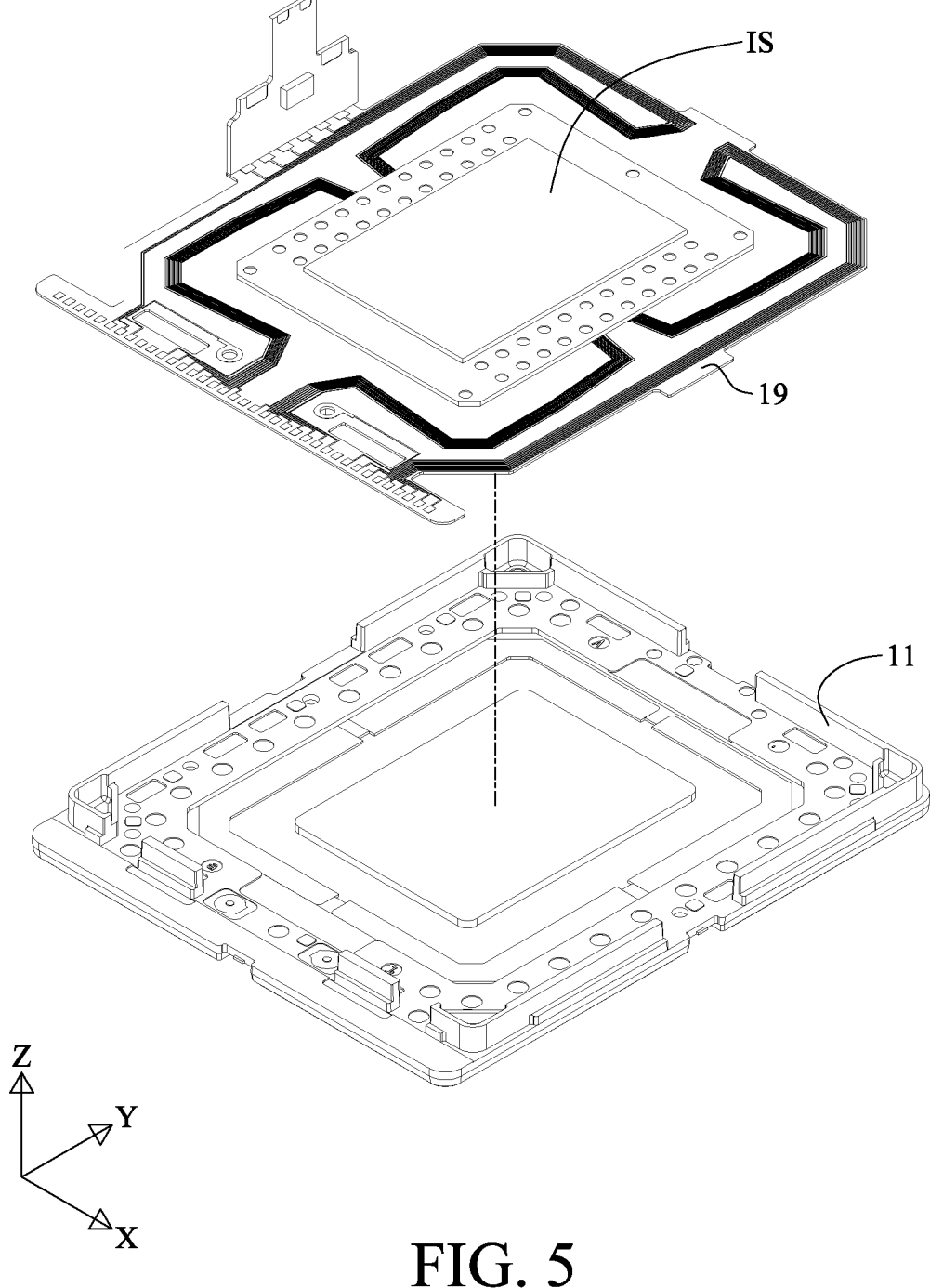
FIG. 5 is an exploded view of a base and an electrical connection element of the imaging lens module in FIG. 2.
Figure 6:
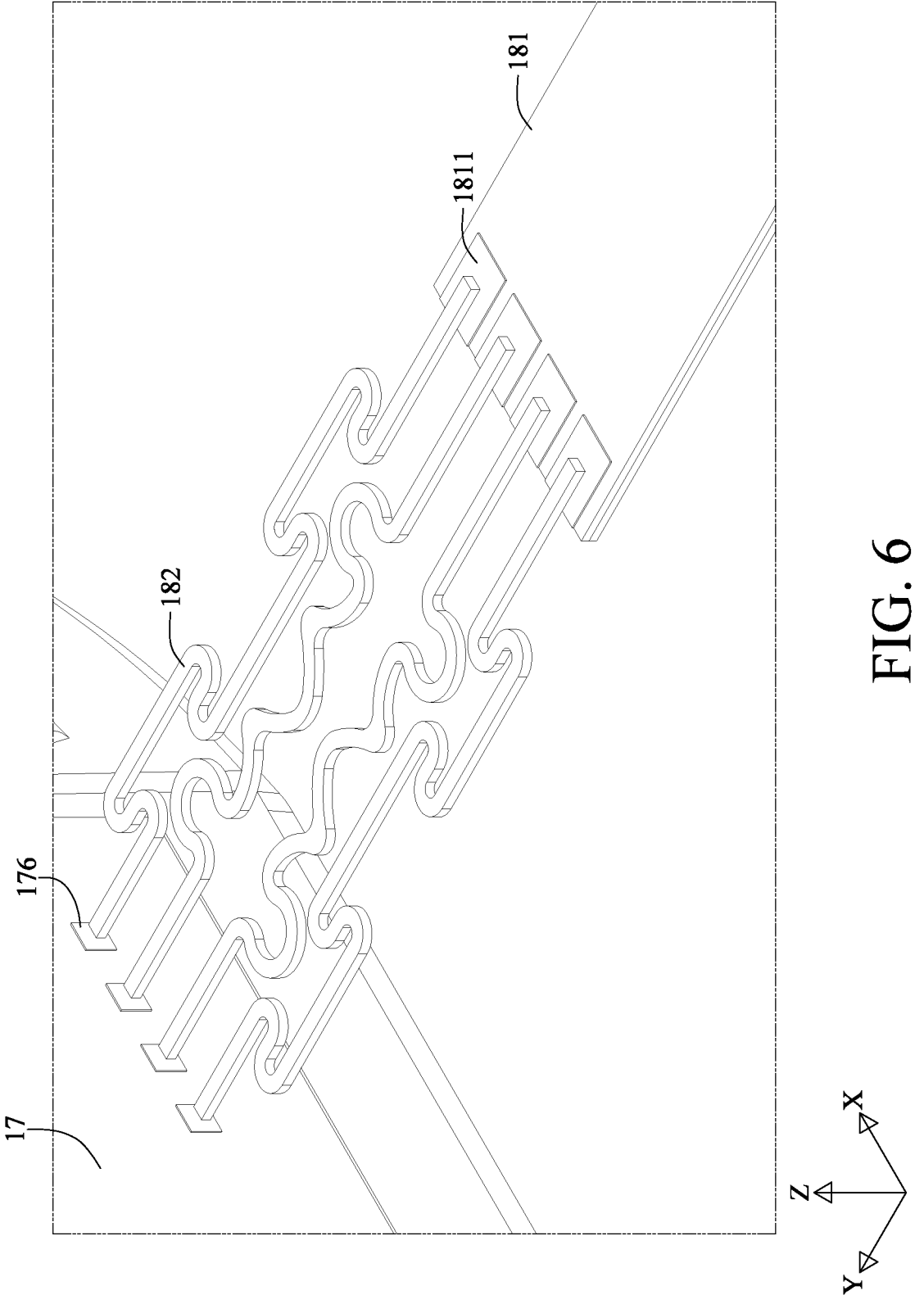
FIG. 6 is an enlarged view of AA region of the variable through hole module and the wiring assembly of the imaging lens module in FIG. 2.
Figure 7:
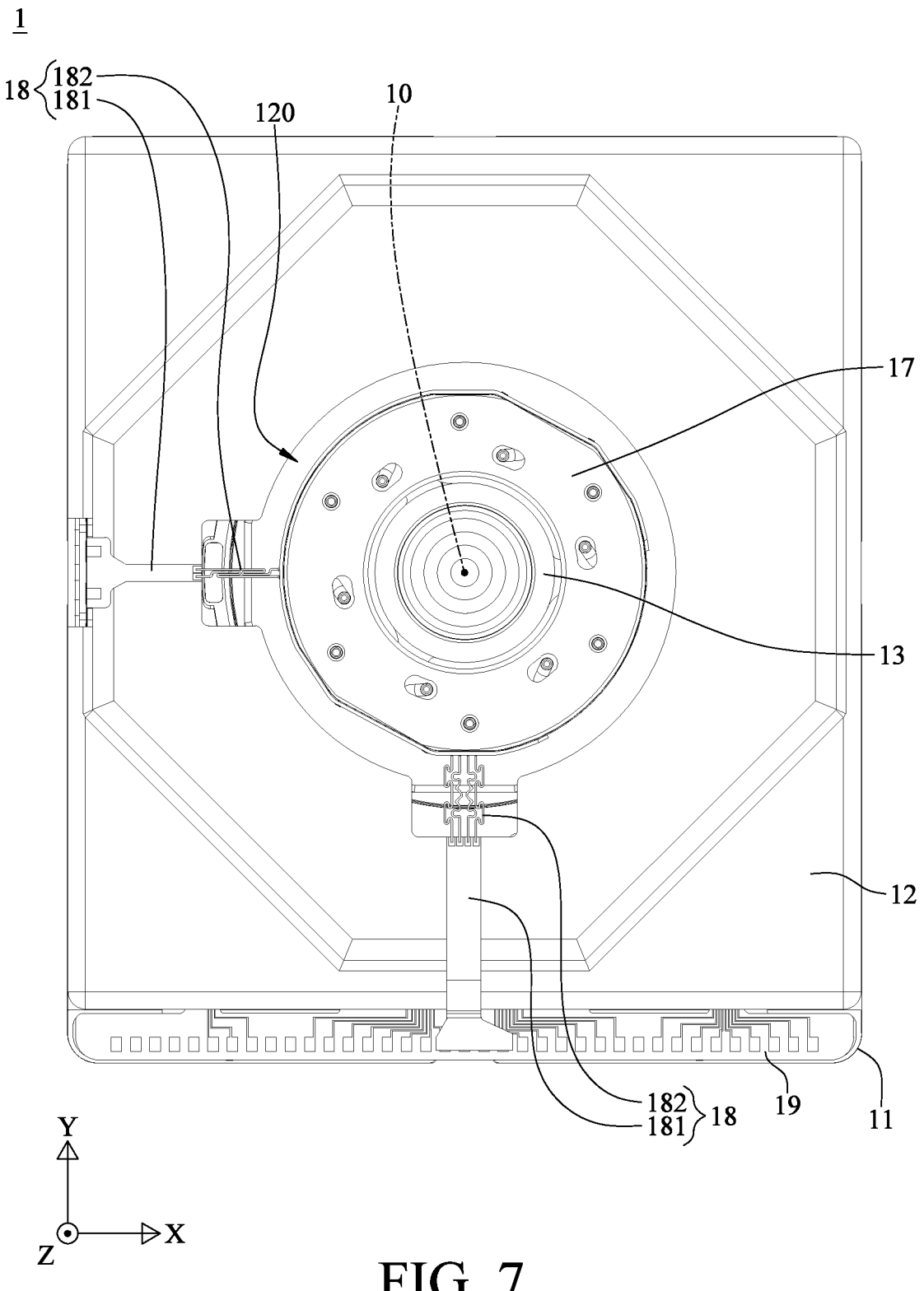
FIG. 7 is a top view of the imaging lens module in FIG. 1.
Figure 8:
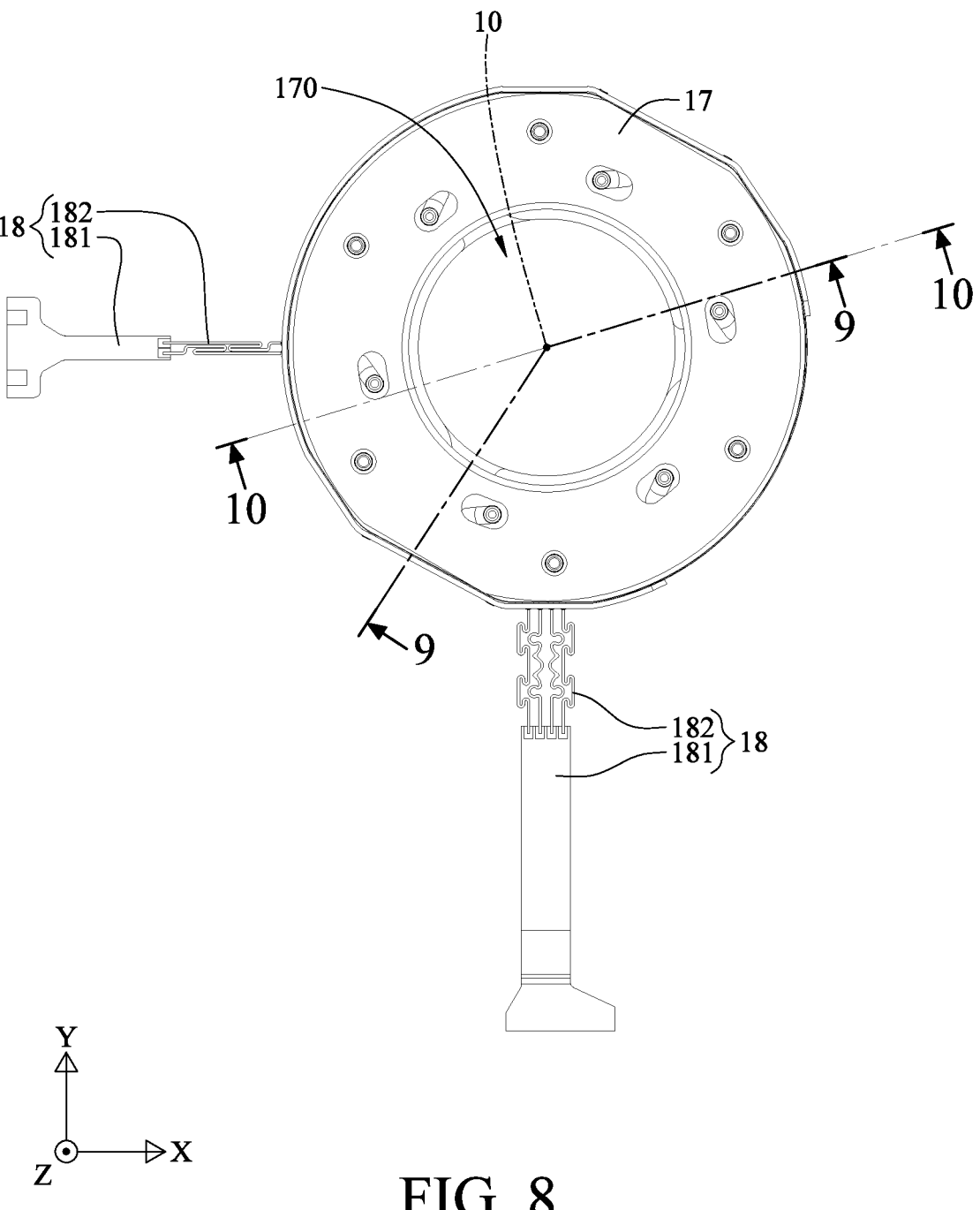
FIG. 8 is a top view of the variable through hole module and the wiring assembly of the imaging lens module in FIG. 7.
Figure 9:
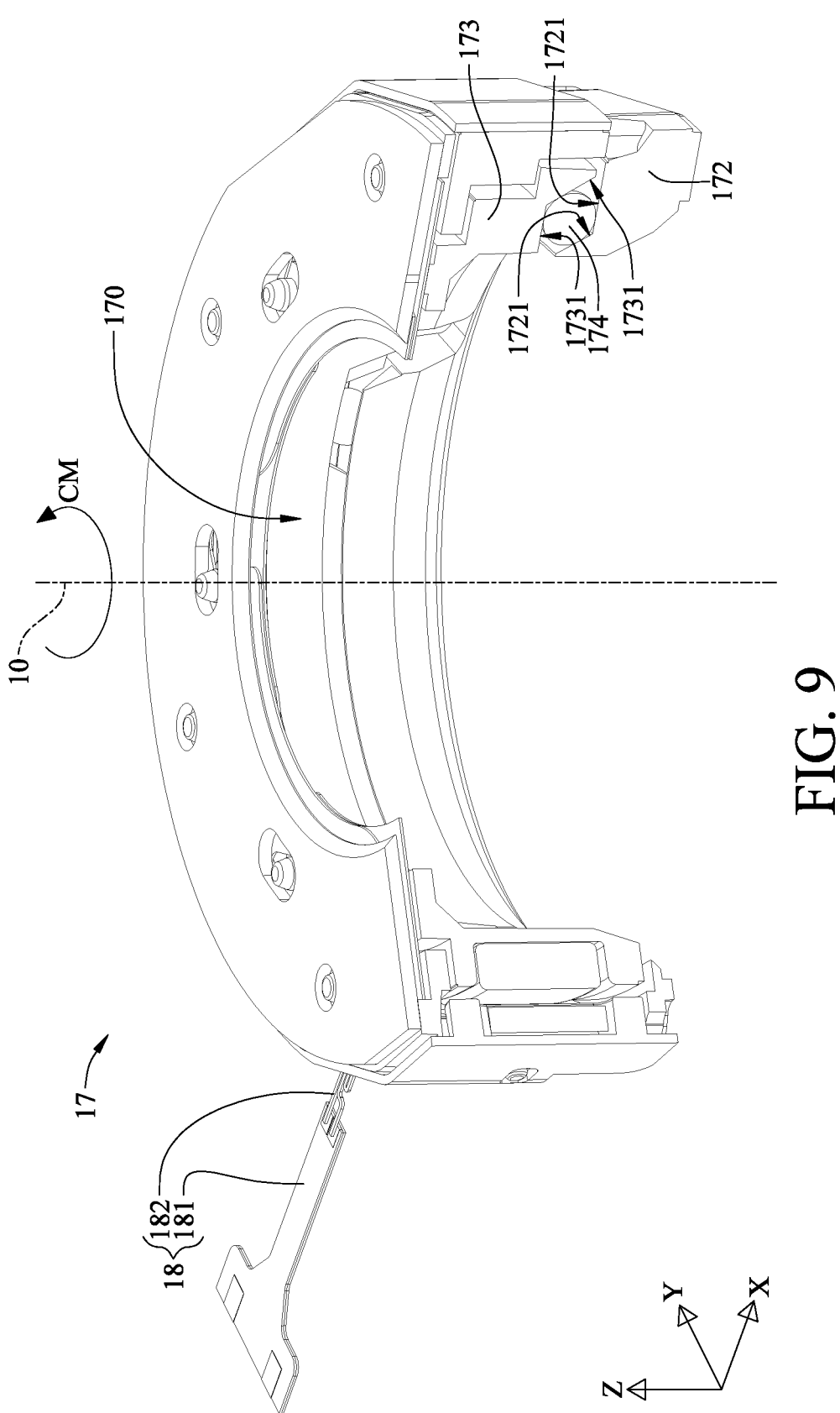
FIG. 9 is a perspective view of the variable through hole module and the wiring assembly in FIG. 8 that have been sectioned along line 9-9.
Figure 10:
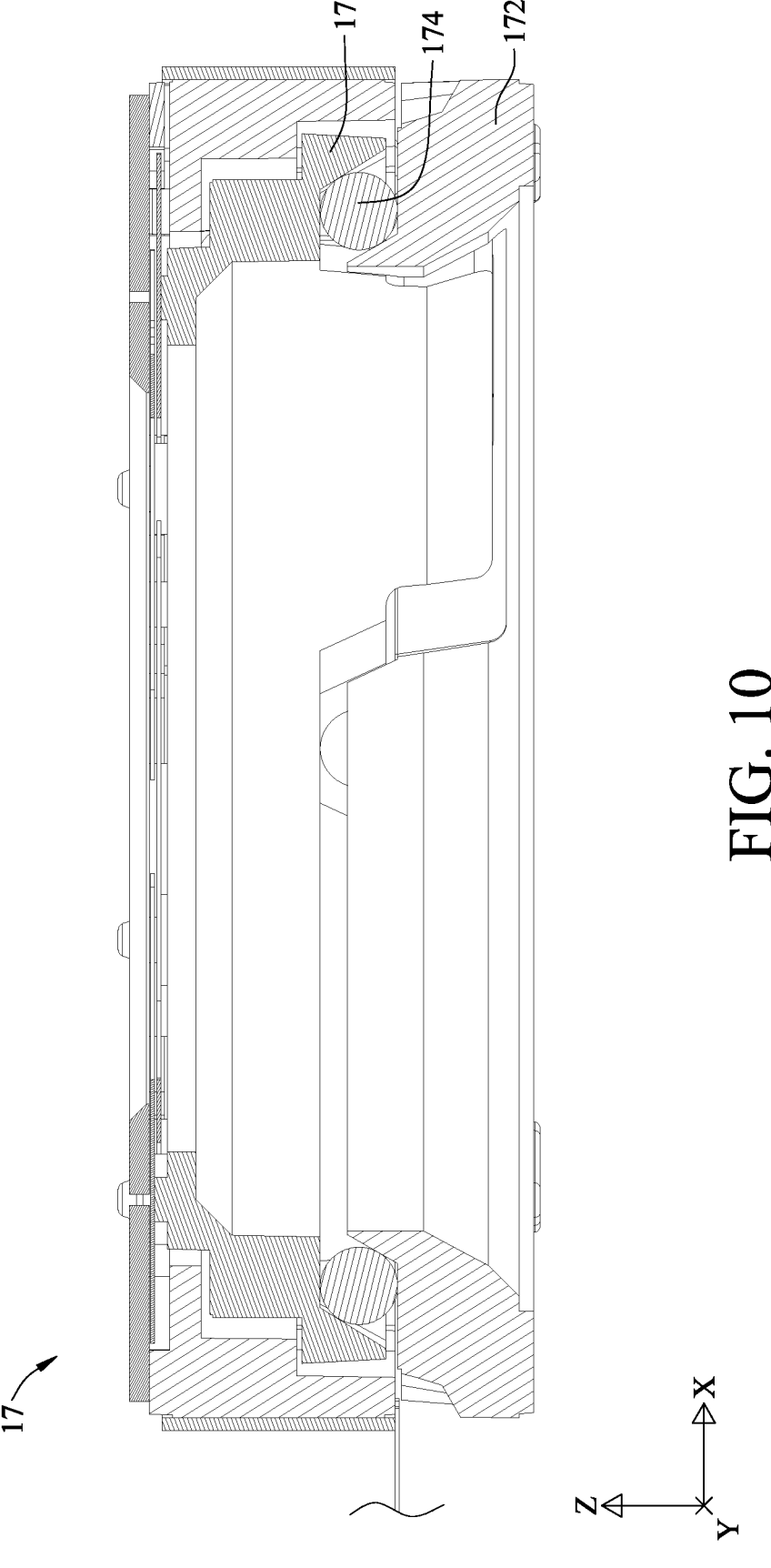
FIG. 10 is a partial and cross-sectional view of the variable through hole module and the wiring assembly in FIG. 8 along line 10-10.
Figure 11:
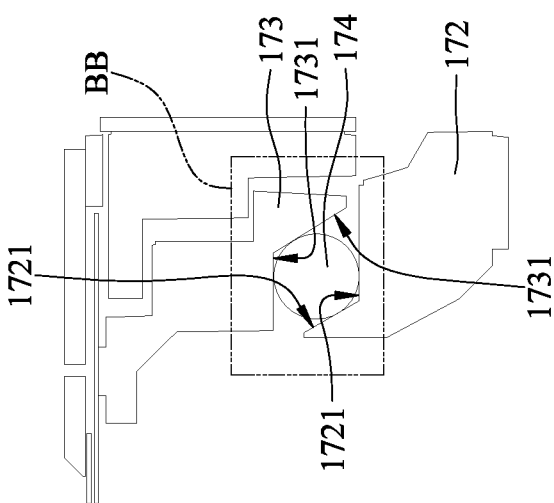
FIG. 11 is a cross-sectional view only schematically showing a partial contour of the variable through hole module FIG. 10.
Figure 11:
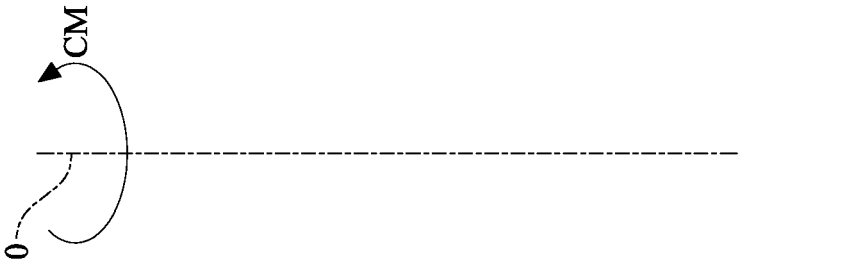
Figure 11:
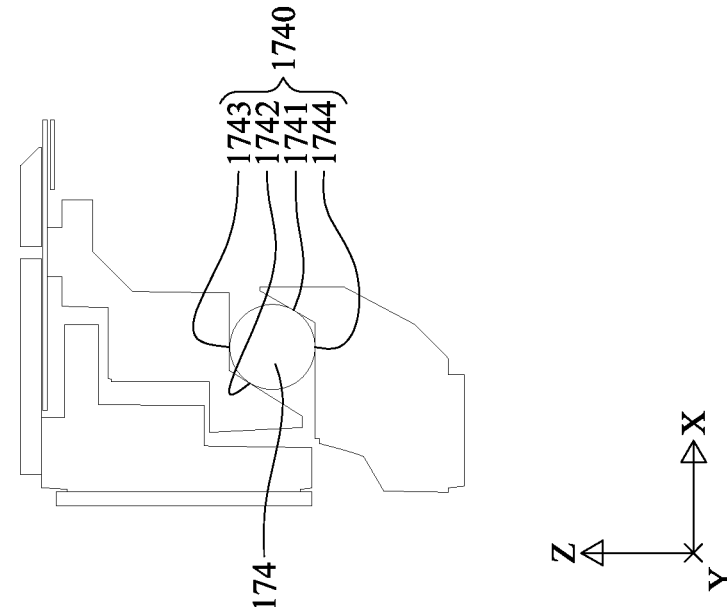
Figure 12:
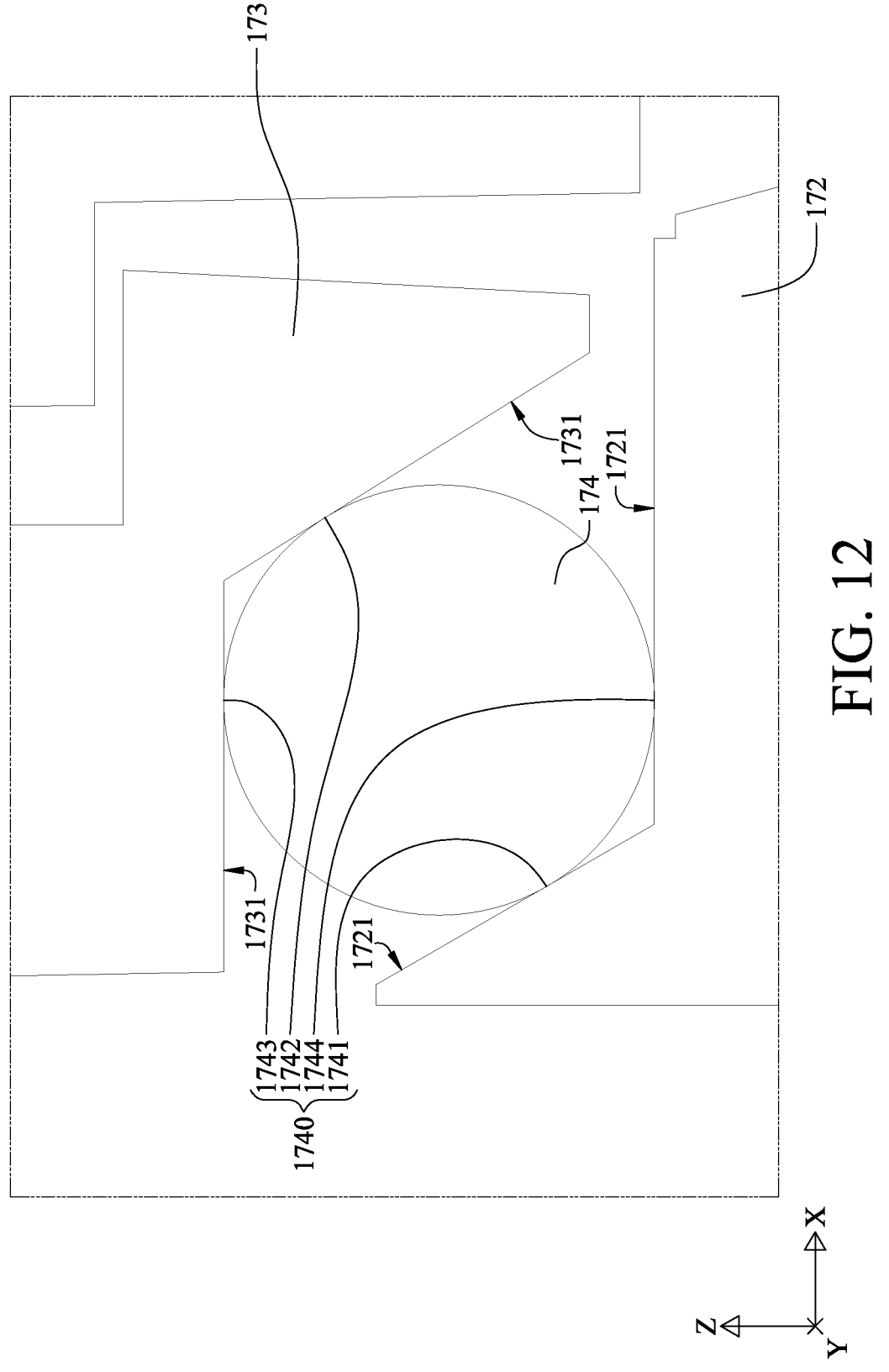
FIG. 12 is an enlarged view of BB region of the partial contour of the variable through hole module in FIG. 11.

Please refer to FIG. 1 to FIG. 12, where FIG. 1 is a perspective view of an imaging lens module according to the 1st embodiment of the present disclosure, FIG. 2 is an exploded view of the imaging lens module in FIG. 1, FIG. 3 is an exploded view of a variable through hole module and a wiring assembly of the imaging lens module in FIG. 2, FIG. 4 is an exploded view of the wiring assembly in FIG. 3, FIG. 5 is an exploded view of a base and an electrical connection element of the imaging lens module in FIG. 2, FIG. 6 is an enlarged view of AA region of the variable through hole module and the wiring assembly of the imaging lens module in FIG. 2, FIG. 7 is a top view of the imaging lens module in FIG. 1, FIG. 8 is a top view of the variable through hole module and the wiring assembly of the imaging lens module in FIG. 7, FIG. 9 is a perspective view of the variable through hole module and the wiring assembly in FIG. 8 that have been sectioned along line 9-9, FIG. 10 is a partial and cross-sectional view of the variable through hole module and the wiring assembly in FIG. 8 along line 10-10, FIG. 11 is a cross-sectional view only schematically showing a partial contour of the variable through hole module FIG. 10, and FIG. 12 is an enlarged view of BB region of the partial contour of the variable through hole module in FIG. 11.

An imaging lens module 1 provided in this embodiment includes a base 11, a casing 12, an imaging lens 13, a lens carrier 14, a set of elastic elements 15, a frame 16, a variable through hole module 17, two sets of wiring assemblies 18, an electrical connection element 19 and an image sensor IS.

The casing 12 is coupled to the base 11 to form an accommodation space (not numbered) therebetween. The casing 12 has an opening 120 exposing the accommodation space.

The imaging lens 13 is disposed to the casing 12, and part of the imaging lens 13 is exposed by the opening 120 of the casing 12. Specifically, the imaging lens 13 has an image part (not numbered) disposed in the accommodation space and an object part (not numbered) exposed to the outside by the opening 120 of the casing 12. The imaging lens 13 includes a plurality of optical lens elements 131 for receiving incident light passing through the opening 120, and the imaging lens module 1 has an optical axis 10 passing through the optical lens elements 131. Please be noted that the shape of the optical lens elements 131 illustrated in the drawings is not intended to restrict the present disclosure, and the optical lens elements 131 may be only schematically illustrated for simplicity.

The lens carrier 14 supports the imaging lens 13. The elastic elements 15 have flexibility. The elastic elements 15 are connected to the lens carrier 14 to provide the lens carrier 14 with a translational degree of freedom along a direction parallel to the optical axis 10. The frame 16 is connected to the elastic elements 15, such that the lens carrier 14 is movable along the direction parallel to the optical axis 10 with respect to the frame 16.

The variable through hole module 17 is coupled to the imaging lens 13, the variable through hole module 17 and the imaging lens 13 have no relative displacement with respect to each other, and the optical axis 10 passes through the center of the variable through hole module 17. The variable through hole module 17 has a light passable hole 170, and the light passable hole 170 has a variable aperture size.

Specifically, the variable through hole module 17 includes a light-blocking blade assembly 171, a fixed element 172, a movable element 173, four rollable supporters 174 and two set of driving mechanisms 175, as shown in FIG. 3.

The light-blocking blade assembly 171 includes a plurality of light-blocking blades 1711 that are arranged along a circumferential direction CM surrounding the optical axis 10 and at least partially overlap with each other so as to form the abovementioned light passable hole 170 with the variable aperture size.

The fixed element 172 is coupled to the imaging lens 13 and includes a first guide structure 1721. The movable element 173 is connected to the light-blocking blade assembly 171 and has a second guide structure 1731. The rollable supporters 174 are disposed between the fixed element 172 and the movable element 173 to provide the movable element 173 with a rotational degree of freedom along the circumferential direction CM surrounding the optical axis 10.

The rollable supporters 174 are in physical contact with the first guide structure 1721 and the second guide structure 1731. Each rollable supporter 174 has a plurality of contact points 1740. The contact points 1740 has an inner contact point 1741, an outer contact point 1742, an upper contact point 1743 and a lower contact point 1744. The inner contact point 1741 is located closer to the optical axis 10 than the other contact points. The outer contact point 1742 is located farther away from the optical axis 10 than the other contact points. The upper contact point 1743 is one of two contact points that are most spaced apart from each other in a direction parallel to the optical axis 10 among the contact points 1740. The lower contact point 1744 is the other one of the two contact points that are most spaced apart from each other in the direction parallel to the optical axis 10 among the contact points 1740.

Please be noted that FIG. 11 and FIG. 12 are schematically illustrated for better showing the physical contact relationship between the rollable supporter 174 and the first guide structure 1721 as well as the second guide structure 1731, and the contour of the variable through hole module 17 may not in compliance with the actual production. Moreover, the first guide structure 1721 and the second guide structure 1731 may have different types in structure so as to have different physical contact manners with the rollable supporter 174.

Figure 13:
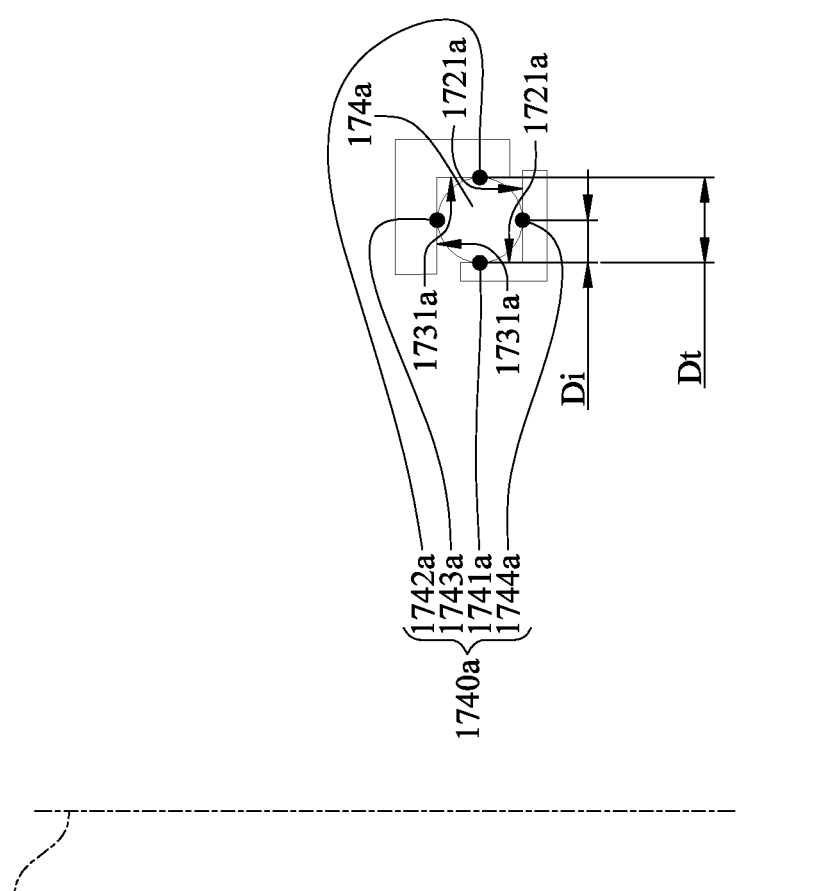
FIG. 13 is a cross-sectional view schematically showing a first configuration from the partial contour of the variable through hole module in FIG. 12.
Figure 13:
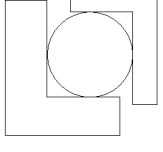
Figure 13:
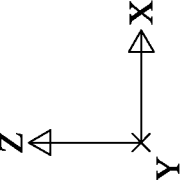

Hereinafter, please further refer to FIG. 13 to FIG. 16 for illustrating four different physical contact manners in detail, with four configurations different from that of the rollable supporter 174 and the first guide structure 1721 as well as the second guide structure 1731 disclosed in the 1st embodiment, and the numeral numbers from the 1st embodiment with the suffix "a", "b", "c" or "d" in the following respectively correspond to components of the first to the fourth configurations in the four physical contact manners. FIG. 13 is a cross-sectional view schematically showing a first configuration from the partial contour of the variable through hole module in FIG. 12, FIG. 14 is a cross-sectional view schematically showing a second configuration from the partial contour of the variable through hole module in FIG. 12, FIG. 15 is a cross-sectional view schematically showing a third configuration from the partial contour of the variable through hole module in FIG. 12, and FIG. 16 is a cross-sectional view schematically showing a fourth configuration from the partial contour of the variable through hole module in FIG. 12.

As shown in FIG. 13, the number of the contact points 1740a is four. The inner contact point 1741a is in physical contact with the first guide structure 1721a at the inner side of the rollable supporter 174a. The outer contact point 1742a is in physical contact with the second guide structure 1731a at the outer side of the rollable supporter 174a. The upper contact point 1743a is in physical contact with the second guide structure 1731a at the upper side of the rollable supporter 174a. The lower contact point 1744a is in physical contact with the first guide structure 1721a at the lower side of the rollable supporter 174a. Moreover, when a distance perpendicular to the optical axis 10 between the inner contact point 1741a and the lower contact point 1744a among the contact points 1740a is Di, and a distance perpendicular to the optical axis 10 between the inner contact point 1741a and the outer contact point 1742a among the contact points 1740a is Dt, the following conditions are satisfied: Di=0.3; Dt=0.6; and Di/Dt=0.5.

Figure 14:
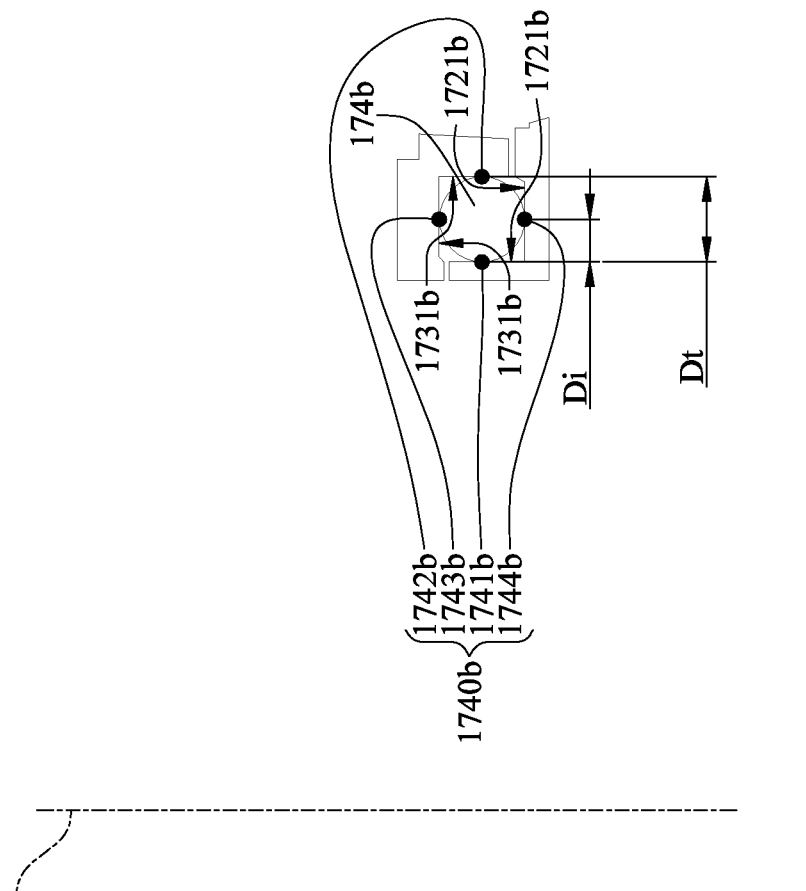
FIG. 14 is a cross-sectional view schematically showing a second configuration from the partial contour of the variable through hole module in FIG. 12.
Figure 14:
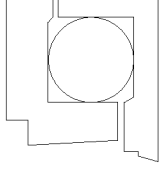
Figure 14:
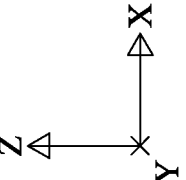

As shown in FIG. 14, the first guide structure 1721b and the second guide structure 1731b form a structure more enclosing the rollable supporter 174b than that in FIG. 13. The number of the contact points 1740b is four. The inner contact point 1741b is in physical contact with the first guide structure 1721b at the inner side of the rollable supporter 174b. The outer contact point 1742b is in physical contact with the second guide structure 1731b at the outer side of the rollable supporter 174b. The upper contact point 1743b is in physical contact with the second guide structure 1731b at the upper side of the rollable supporter 174b. The lower contact point 1744b is in physical contact with the first guide structure 1721b at the lower side of the rollable supporter 174b. Moreover, when a distance perpendicular to the optical axis 10 between the inner contact point 1741b and the lower contact point 1744b among the contact points 1740b is Di, and a distance perpendicular to the optical axis 10 between the inner contact point 1741b and the outer contact point 1742b among the contact points 1740b is Dt, the following conditions are satisfied: Di=0.3; Dt=0.6; and Di/Dt=0.5.

Figure 15:
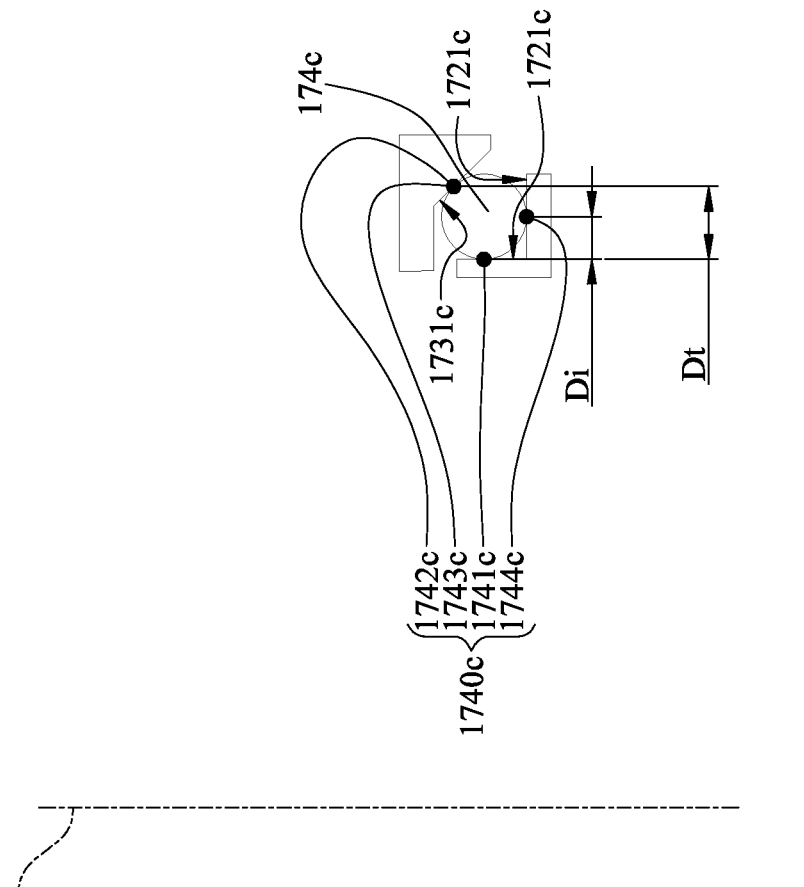
FIG. 15 is a cross-sectional view schematically showing a third configuration from the partial contour of the variable through hole module in FIG. 12.
Figure 15:
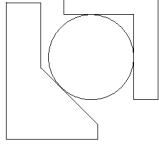
Figure 15:
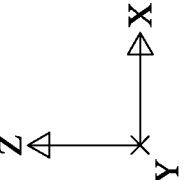
Figure 16:
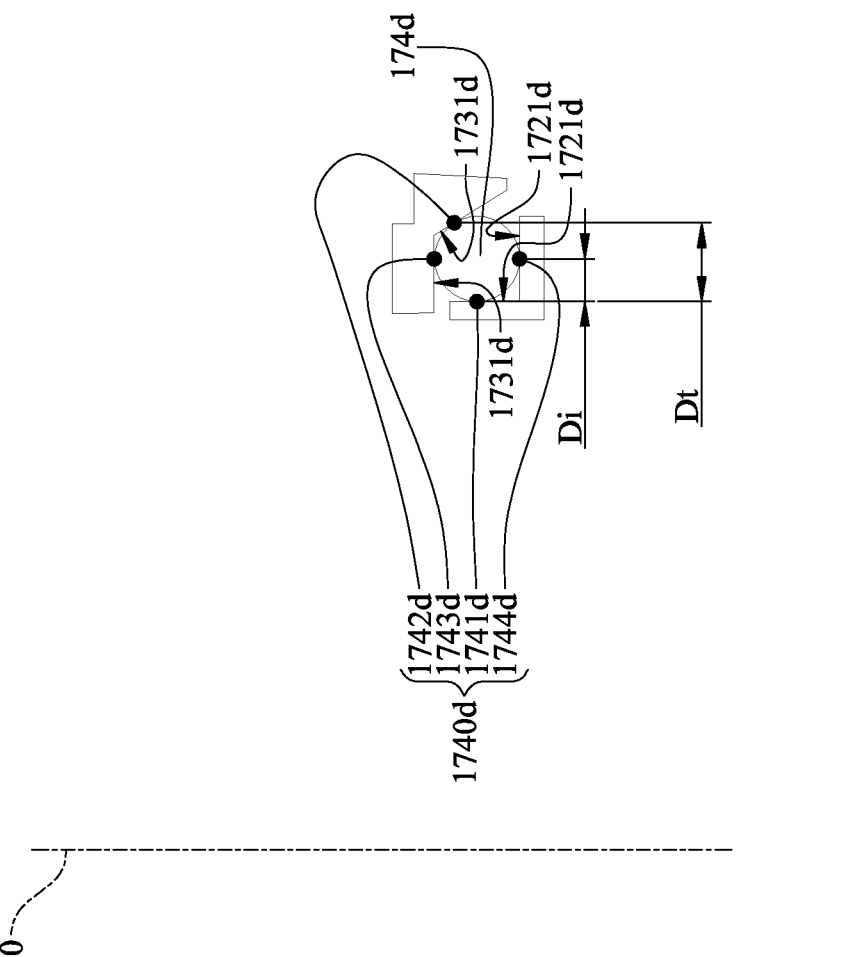
FIG. 16 is a cross-sectional view schematically showing a fourth configuration from the partial contour of the variable through hole module in FIG. 12.
Figure 16:
Figure 16:
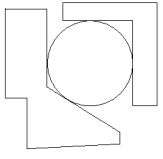
Figure 16:
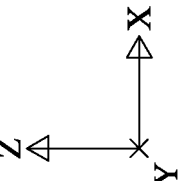

As shown in FIG. 15, the number of the contact points 1740c is three. The inner contact point 1741c is in physical contact with the first guide structure 1721c at the inner side of the rollable supporter 174c. The outer contact point 1742c and the upper contact point 1743c are the same contact point, which is one of two contact points that are most spaced apart from each other in a direction parallel to the optical axis 10 among the contact points 1740c and also located farther away from the optical axis 10 than the other contact points. The outer contact point 1742c, or the upper contact point 1743c, is in physical contact with the second guide structure 1731c at the upper and outer side of the rollable supporter 174c. The lower contact point 1744c is in physical contact with the first guide structure 1721c at the lower side of the rollable supporter 174c. Moreover, when a distance perpendicular to the optical axis 10 between the inner contact point 1741c and the lower contact point 1744c among the contact points 1740c is Di, and a distance perpendicular to the optical axis 10 between the inner contact point 1741c and the outer contact point 1742c among the contact points 1740c is Dt, the following conditions are satisfied: Di=0.3; Dt=0.51; and Di/Dt=0.59.

As shown in FIG. 16, the number of the contact points 1740d is four. The inner contact point 1741d is in physical contact with the first guide structure 1721d at the inner side of the rollable supporter 174d. The outer contact point 1742d is in physical contact with the second guide structure 1731d at the upper and outer side of the rollable supporter 174d. The upper contact point 1743d is in physical contact with the second guide structure 1731d at the upper side of the rollable supporter 174d. The lower contact point 1744d is in physical contact with the first guide structure 1721d at the lower side of the rollable supporter 174d. Moreover, when a distance perpendicular to the optical axis 10 between the inner contact point 1741d and the lower contact point 1744d among the contact points 1740d is Di, and a distance perpendicular to the optical axis 10 between the inner contact point 1741d and the outer contact point 1742d among the contact points 1740d is Dt, the following conditions are satisfied: Di=0.3; Dt=0.55; and Di/Dt=0.55.

The driving mechanisms 175 are able to rotate the movable element 173 along the circumferential direction CM and to drive the light-blocking blade assembly 171 for adjusting the variable aperture size of the light passable hole 170.

The wiring assemblies 18 are electrically connected to the variable through hole module 17. When a maximum height of the wiring assemblies 18 along a direction parallel to the optical axis 10 is Hw, and a maximum height of the casing 12 along a direction parallel to the optical axis 10 is Hc, the following condition is satisfied: Hw Hc, as shown in FIG. 1.

As shown in FIG. 7, when the imaging lens module 1 is observed along a direction from an object side of the imaging lens 13 to an image side of the imaging lens 13, whole of each wiring assembly 18 is exposed by the casing 12, and whole of each elastic element 15 is covered by the casing 12.

Specifically, each wiring assembly 18 includes a fixed wiring part 181 and a movable wiring part 182. The fixed wiring part 181 is disposed at the outer side of the casing 12 and is at least partially located closer to the opening 120 of the casing 12 than the elastic element 15. The movable wiring part 182 has flexibility and is curved, as shown in FIG. 6. The movable wiring part 182 is electrically connected to the fixed wiring part 181 and the variable through hole module 17. Moreover, as shown in FIG. 6, the variable through hole module 17 has a plurality of first electrical connection terminals 176, and the fixed wiring part 181 has a plurality of second electrical connection terminals 1811. The first electrical connection terminals 176 and the second electrical connection terminals 1811 are orthogonal to each other, and the movable wiring part 182 with conductivity is connected to and located between the first electrical connection terminals 176 and the second electrical connection terminals 1811 so as to achieve the electrical connection between the variable through hole module 17 and the fixed wiring part 181. Further, the flexibility of the movable wiring part 182 is able to reducing interference with the electrical signal transmission during relative displacement between the variable through hole module 17 and the fixed wiring part 181.

As shown in FIG. 5, the electrical connection element 19 is disposed corresponding to the base 11. And, as shown in FIG. 1, the electrical connection element 19 is electrically connected to the fixed wiring parts 181 of the wiring assemblies 18. The image sensor IS is disposed at the image side of the imaging lens 13 and is electrically connected to the electrical connection element 19.

2nd Embodiment

Figure 17:
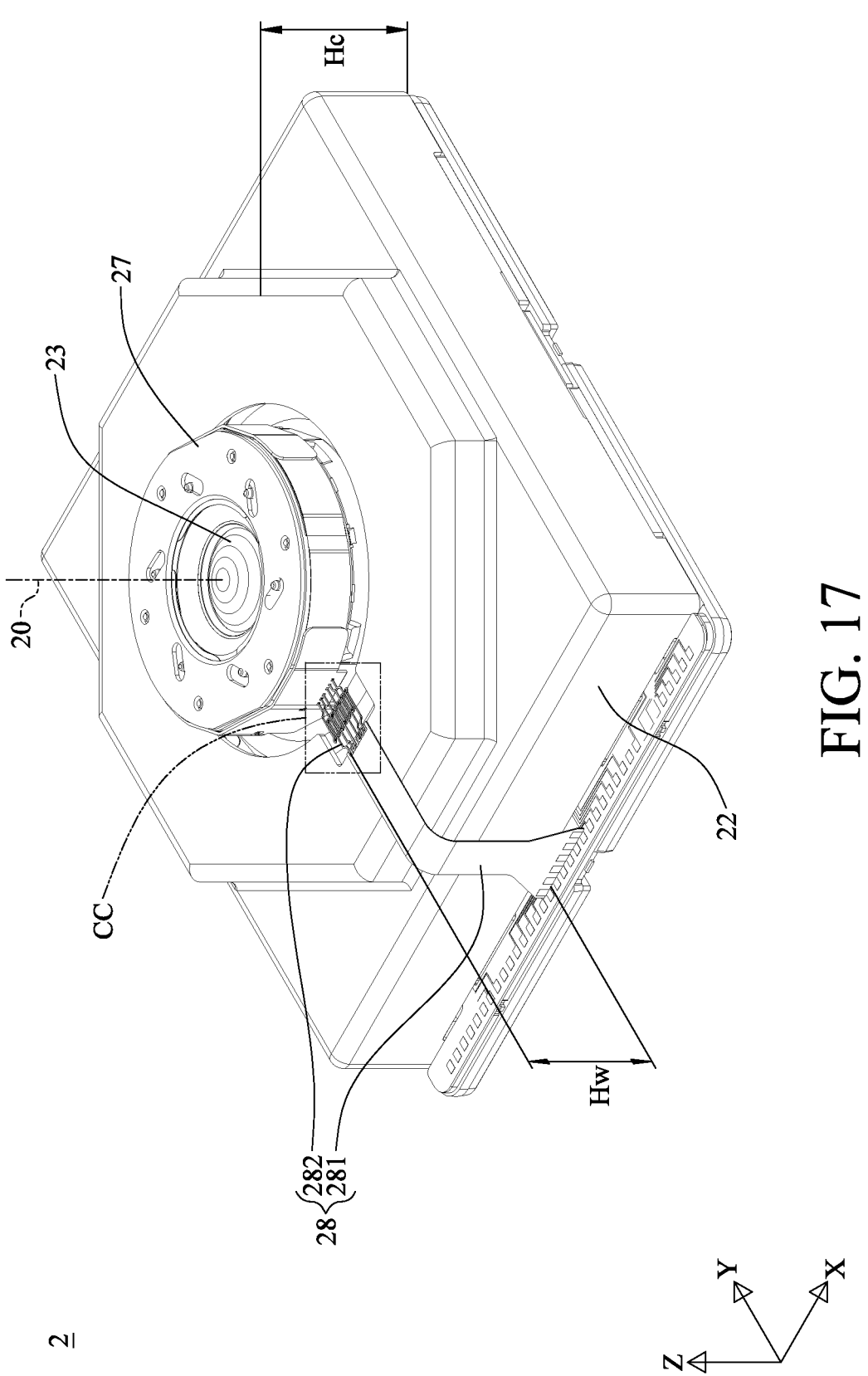
FIG. 17 is a perspective view of an imaging lens module according to a 2nd embodiment of the present disclosure.
Figure 18:
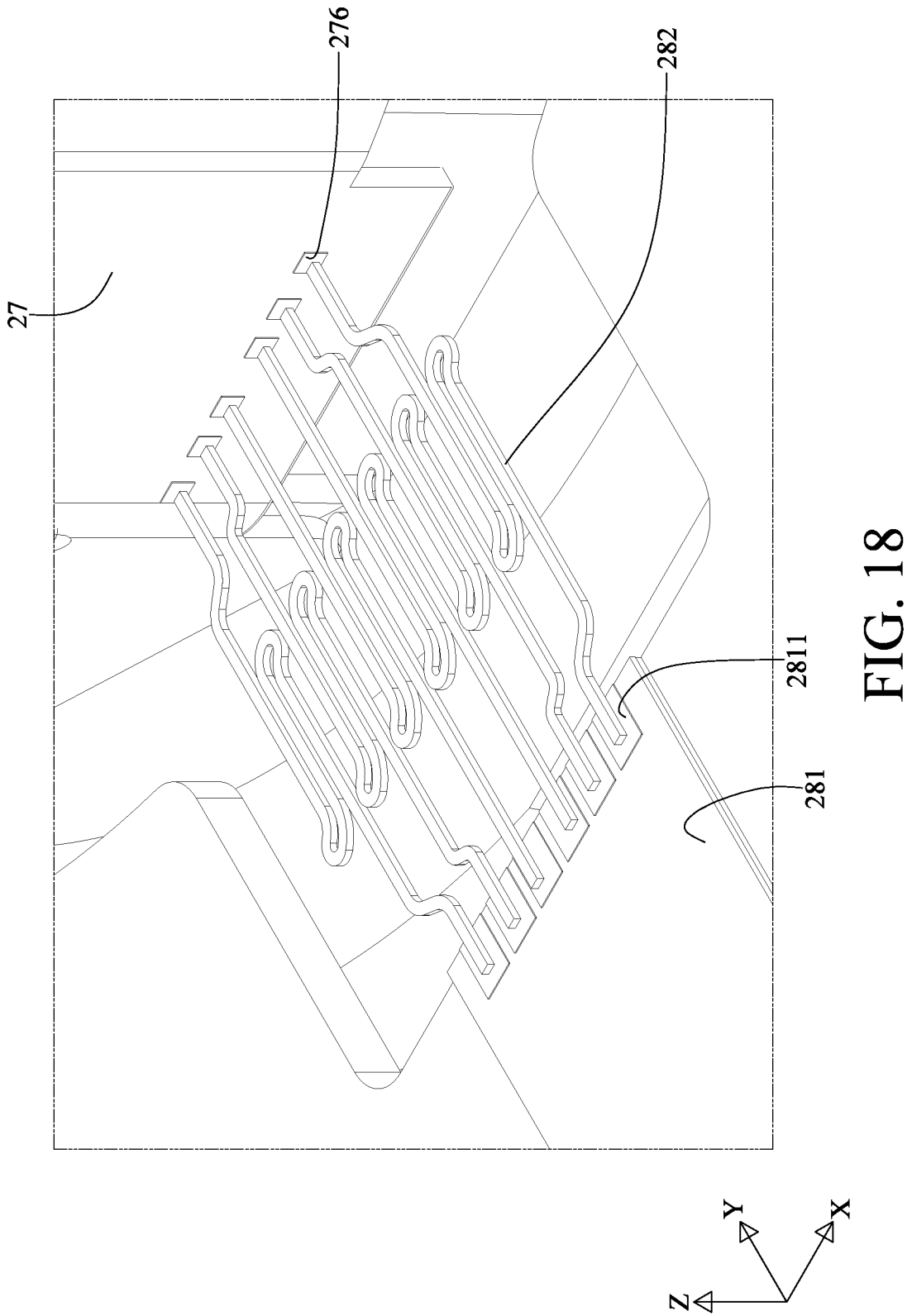
FIG. 18 is an enlarged view of CC region of the imaging lens module in FIG. 17.
Figure 19:
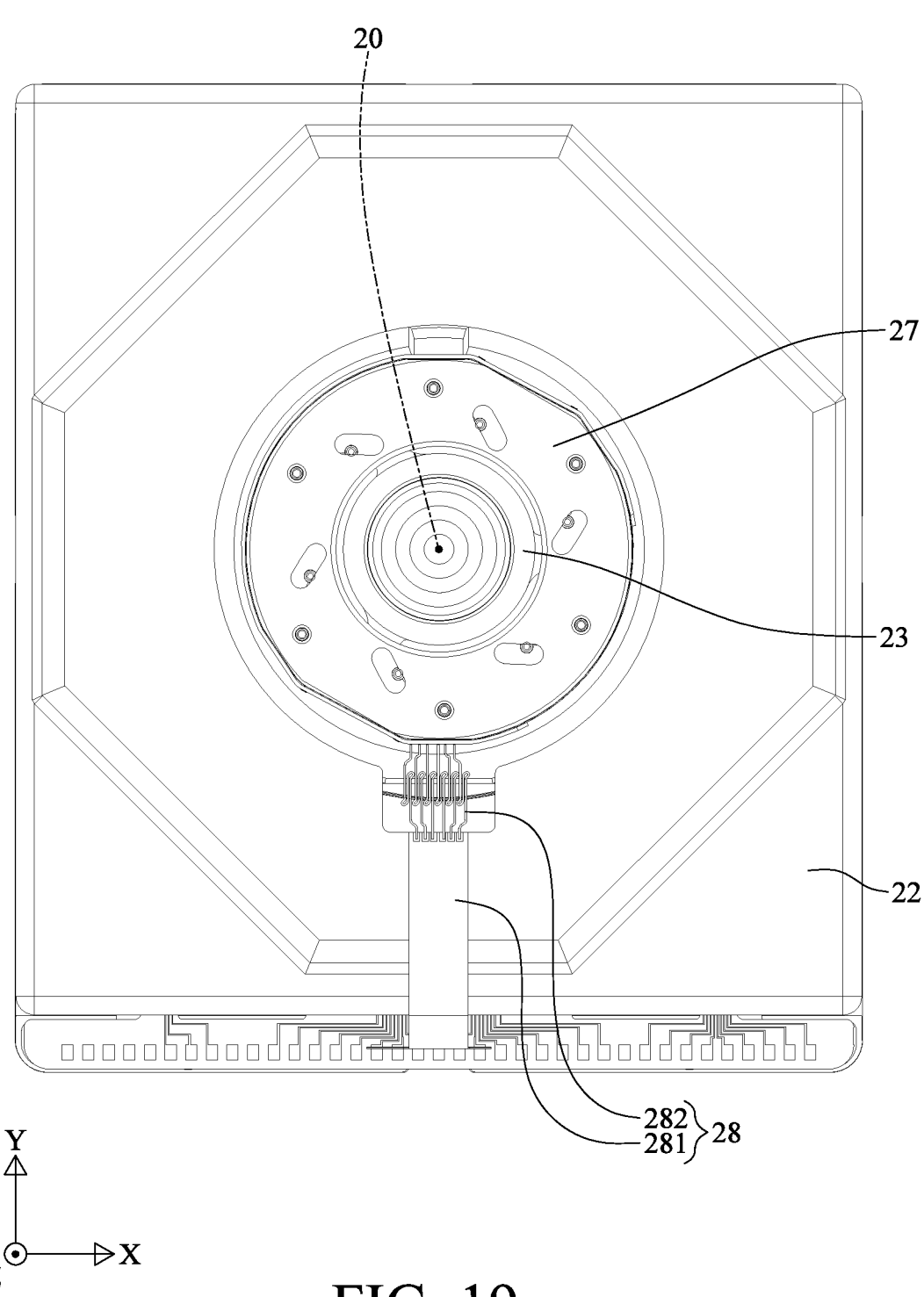
FIG. 19 is a top view of the imaging lens module in FIG. 17.

Please refer to FIG. 17 to FIG. 19, where FIG. 17 is a perspective view of an imaging lens module according to a 2nd embodiment of the present disclosure, FIG. 18 is an enlarged view of CC region of the imaging lens module in FIG. 17, and FIG. 19 is a top view of the imaging lens module in FIG. 17.

An imaging lens module 2 provided in this embodiment is substantially similar to the imaging lens module 1 of the 1st embodiment in structure. Only difference between this and the 1st embodiments together with description relating to essential structure will be illustrated hereinafter.

In this embodiment, when a maximum height of the wiring assembly 28 along a direction parallel to the optical axis 20 is Hw, and a maximum height of the casing 22 along a direction parallel to the optical axis 20 is Hc, the following condition is satisfied: Hw Hc, as shown in FIG. 17.

As shown in FIG. 19, when the imaging lens module 2 is observed along a direction from an object side of the imaging lens 23 to an image side of the imaging lens 23, whole of the wiring assembly 28 is exposed by the casing 22, and whole of the elastic element (not shown in the drawings of this embodiment) is covered by the casing 22.

Unlike the two sets of the wiring assemblies 18 in the 1st embodiment, there is only one set of the wiring assembly 28 in this embodiment. The wiring assembly 28 includes a fixed wiring part 281 and a movable wiring part 282. The fixed wiring part 281 is disposed at the outer side of the casing 22. The movable wiring part 282 has flexibility and is curved, as shown in FIG. 18. The movable wiring part 282 is electrically connected to the fixed wiring part 281 and the variable through hole module 27. Moreover, as shown in FIG. 18, the variable through hole module 27 has a plurality of first electrical connection terminals 276, and the fixed wiring part 281 has a plurality of second electrical connection terminals 2811. The first electrical connection terminals 276 and the second electrical connection terminals 2811 are orthogonal to each other, and the movable wiring part 282 with conductivity is connected to and located between the first electrical connection terminals 276 and the second electrical connection terminals 2811 so as to achieve the electrical connection between the variable through hole module 27 and the fixed wiring part 281. Further, the flexibility of the movable wiring part 282 is able to reducing interference with the electrical signal transmission during relative displacement between the variable through hole module 27 and the fixed wiring part 281.

3rd Embodiment

Figure 20:
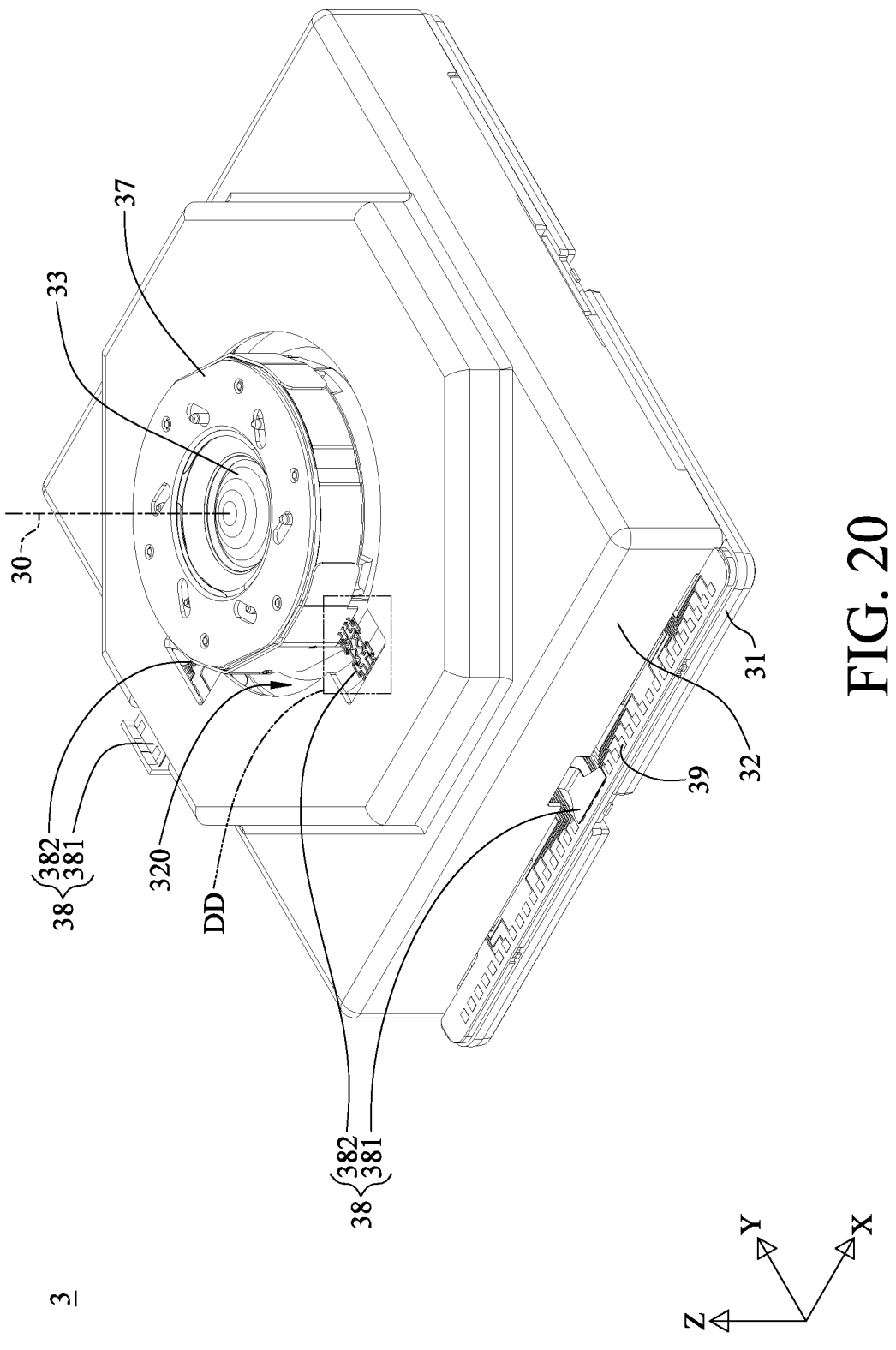
FIG. 20 is a perspective view of an imaging lens module according to the 3rd embodiment of the present disclosure.
Figure 21:
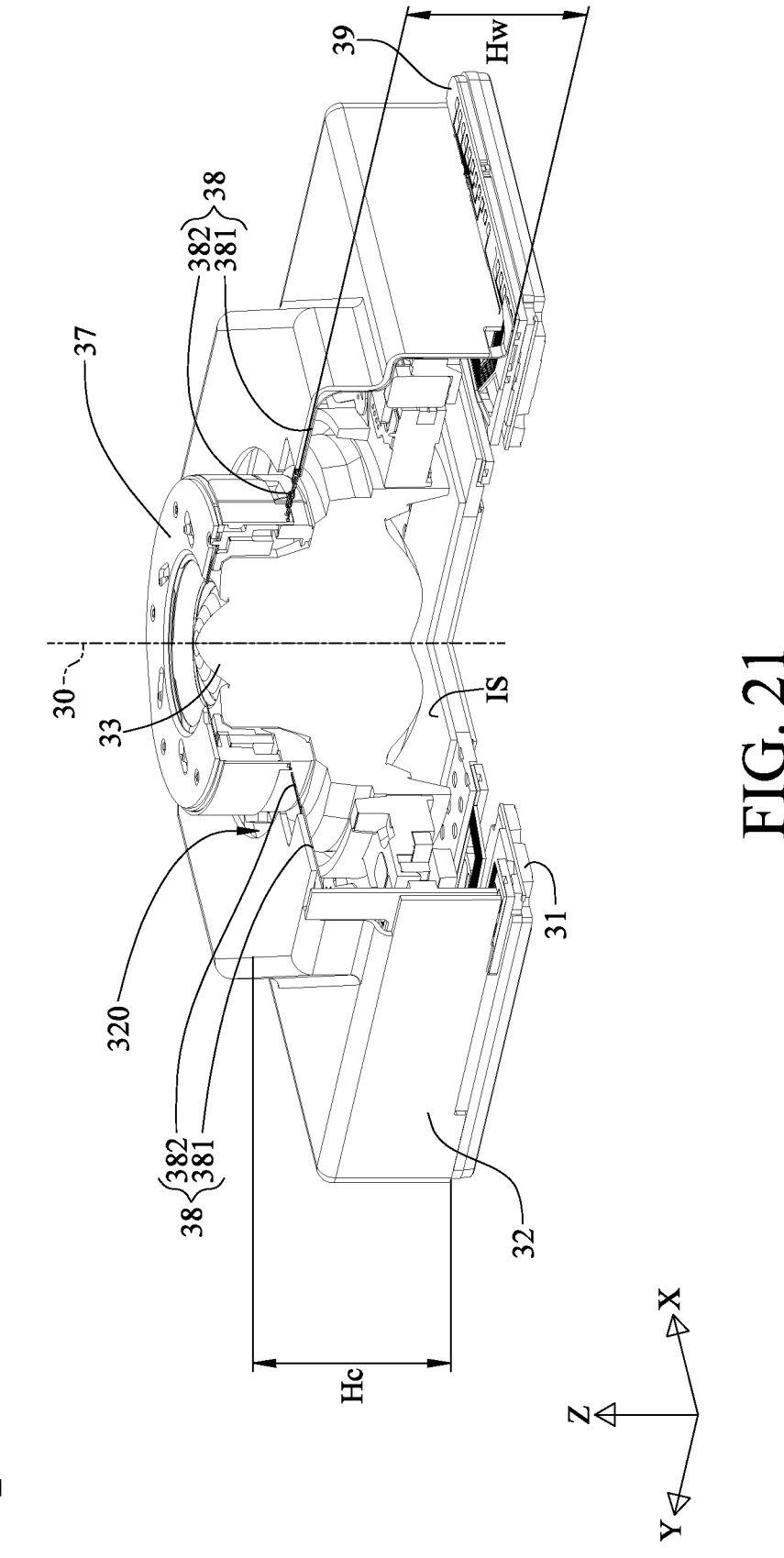
FIG. 21 is a perspective view of the imaging lens module in FIG. 20 that has been partially sectioned.
Figure 22:
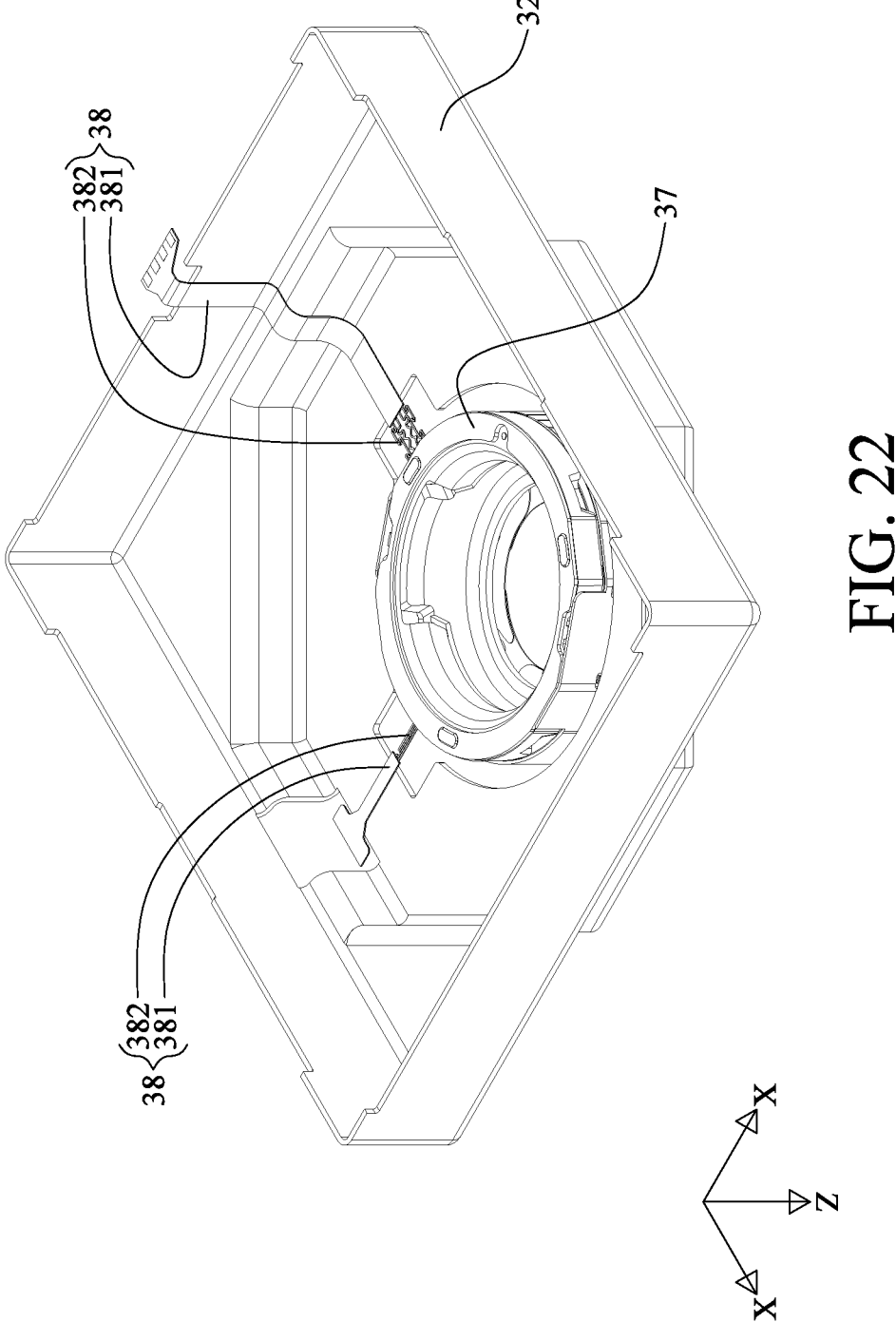
FIG. 22 is another perspective view of a casing, a variable through hole module and a wiring assembly of the imaging lens module in FIG. 21.
Figure 23:
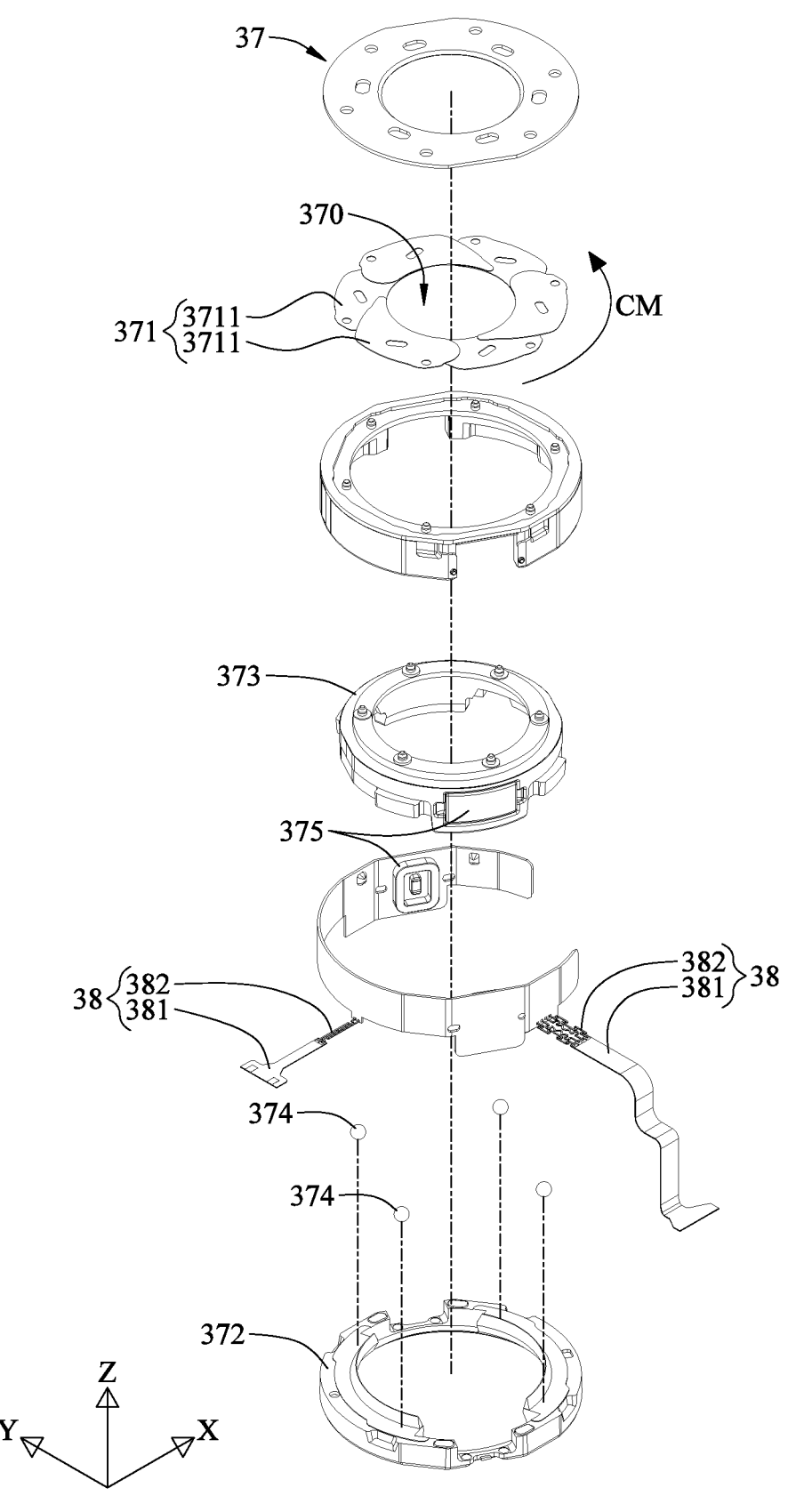
FIG. 23 is an exploded view of the variable through hole module and the wiring assembly of the imaging lens module in FIG. 20.
Figure 24:
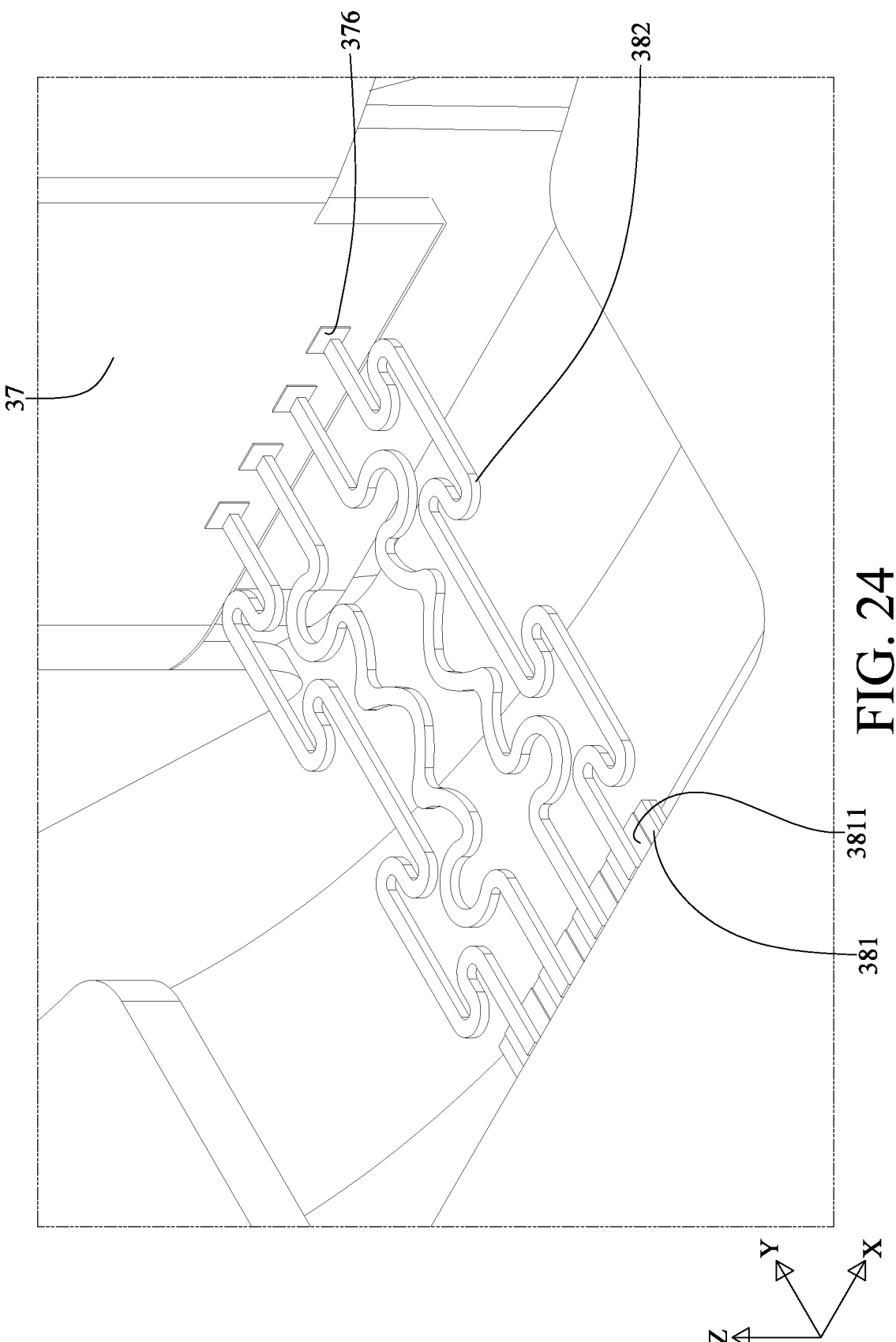
FIG. 24 is an enlarged view of DD region of the imaging lens module in FIG. 20.
Figure 25:
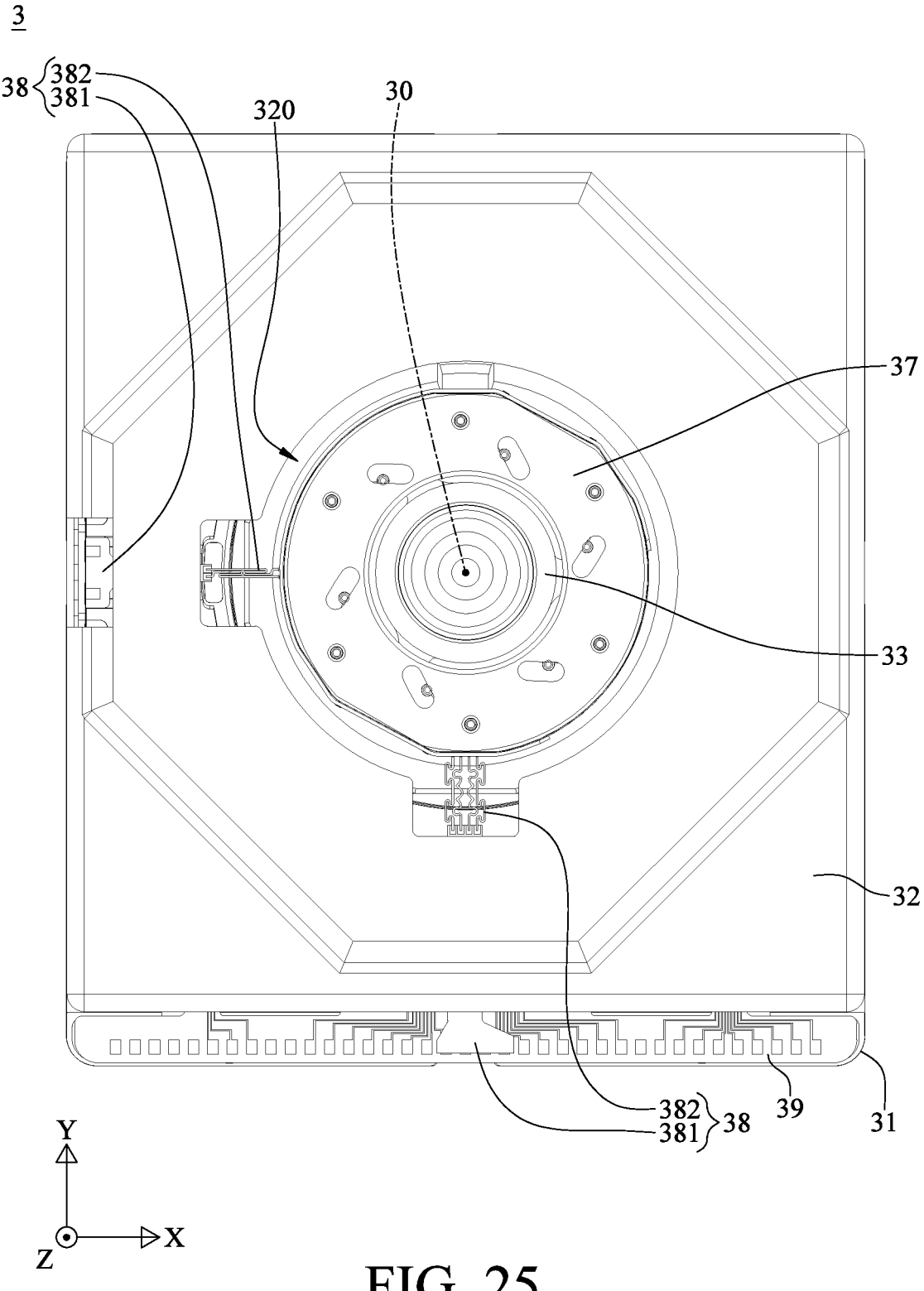
FIG. 25 is a top view of the imaging lens module in FIG. 20.
Figure 26:
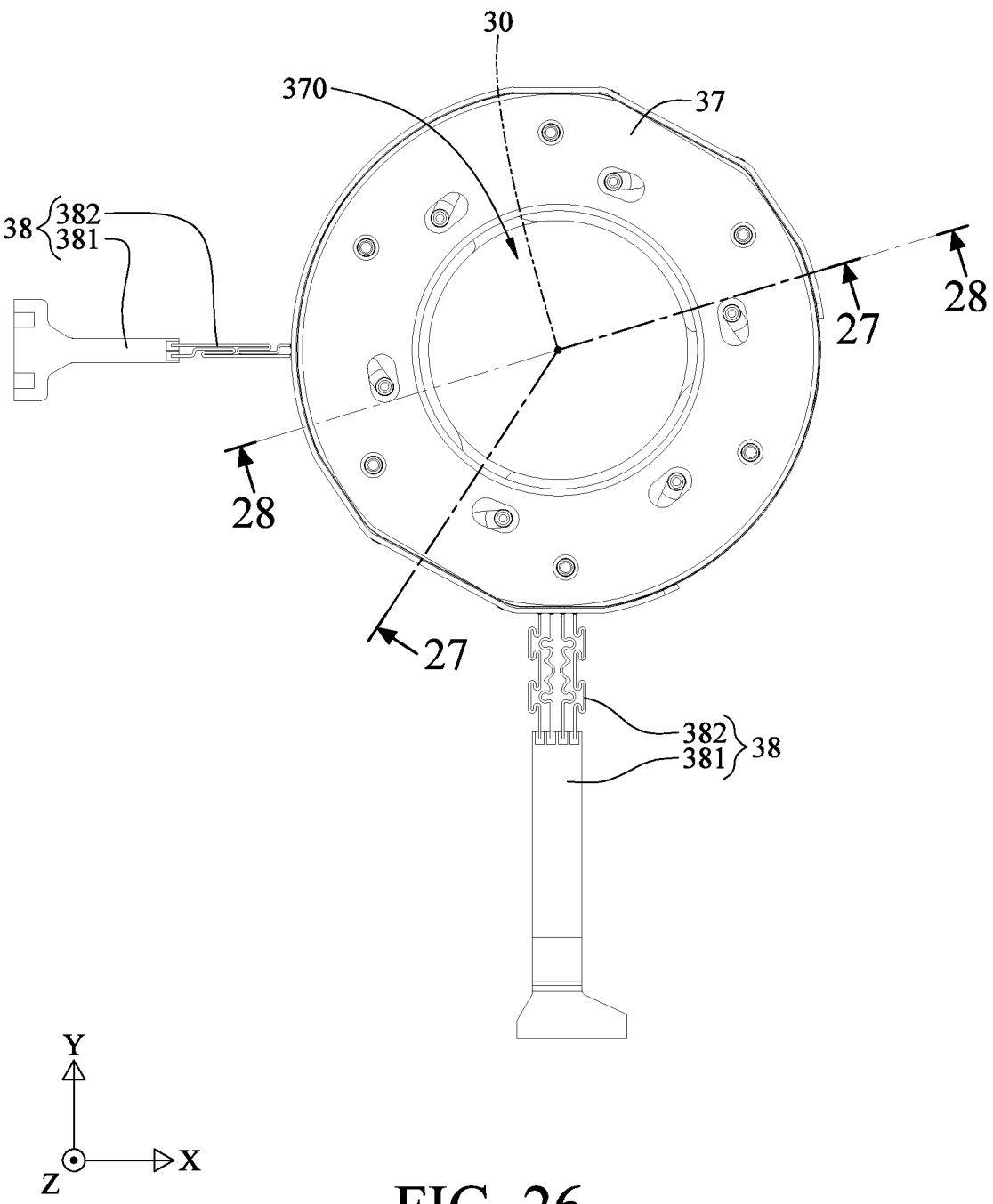
FIG. 26 is a top view of the variable through hole module and the wiring assembly of the imaging lens module in FIG. 25.
Figure 27:
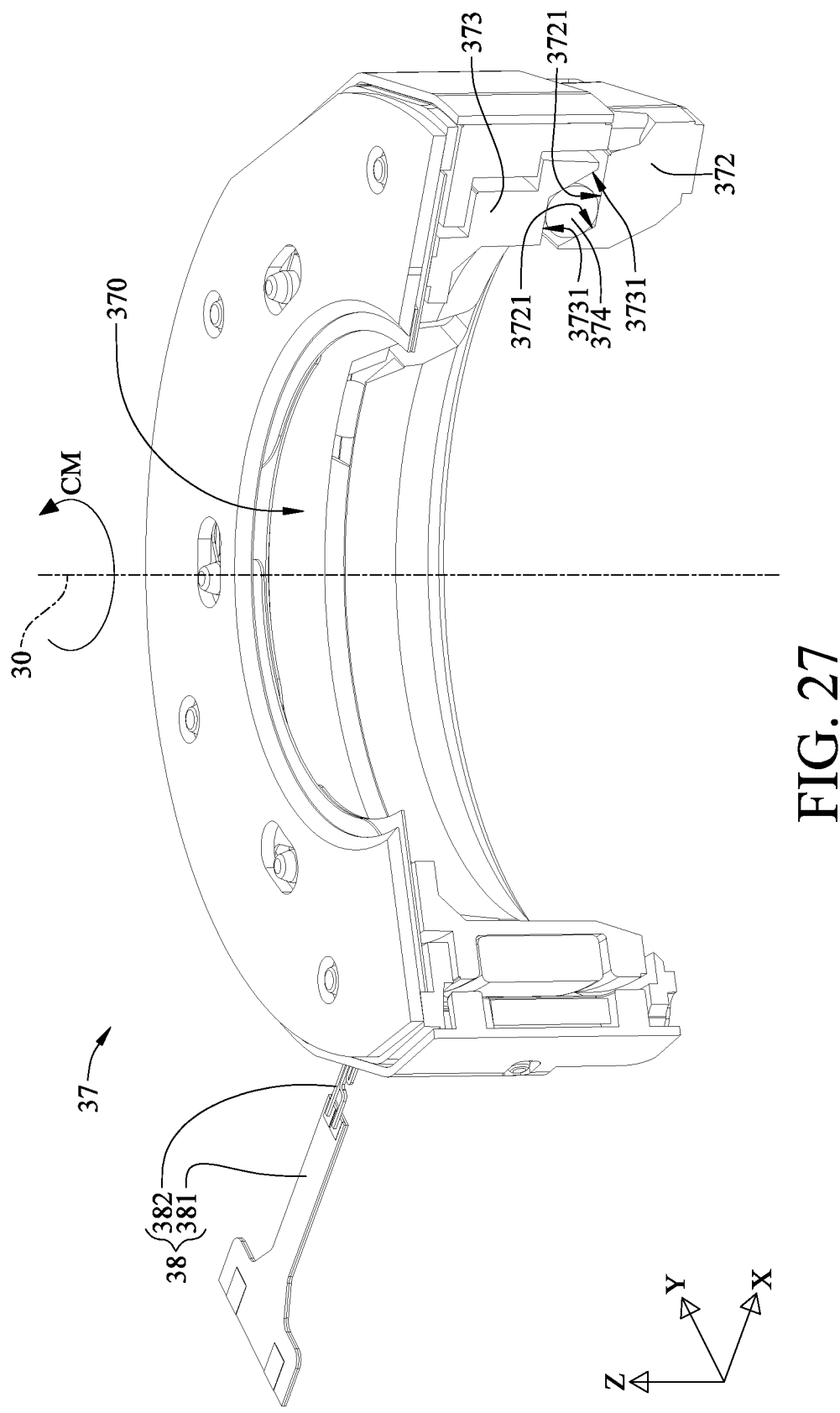
FIG. 27 is a perspective view of the variable through hole module and the wiring assembly in FIG. 26 that have been sectioned along line 27-27.
Figure 28:
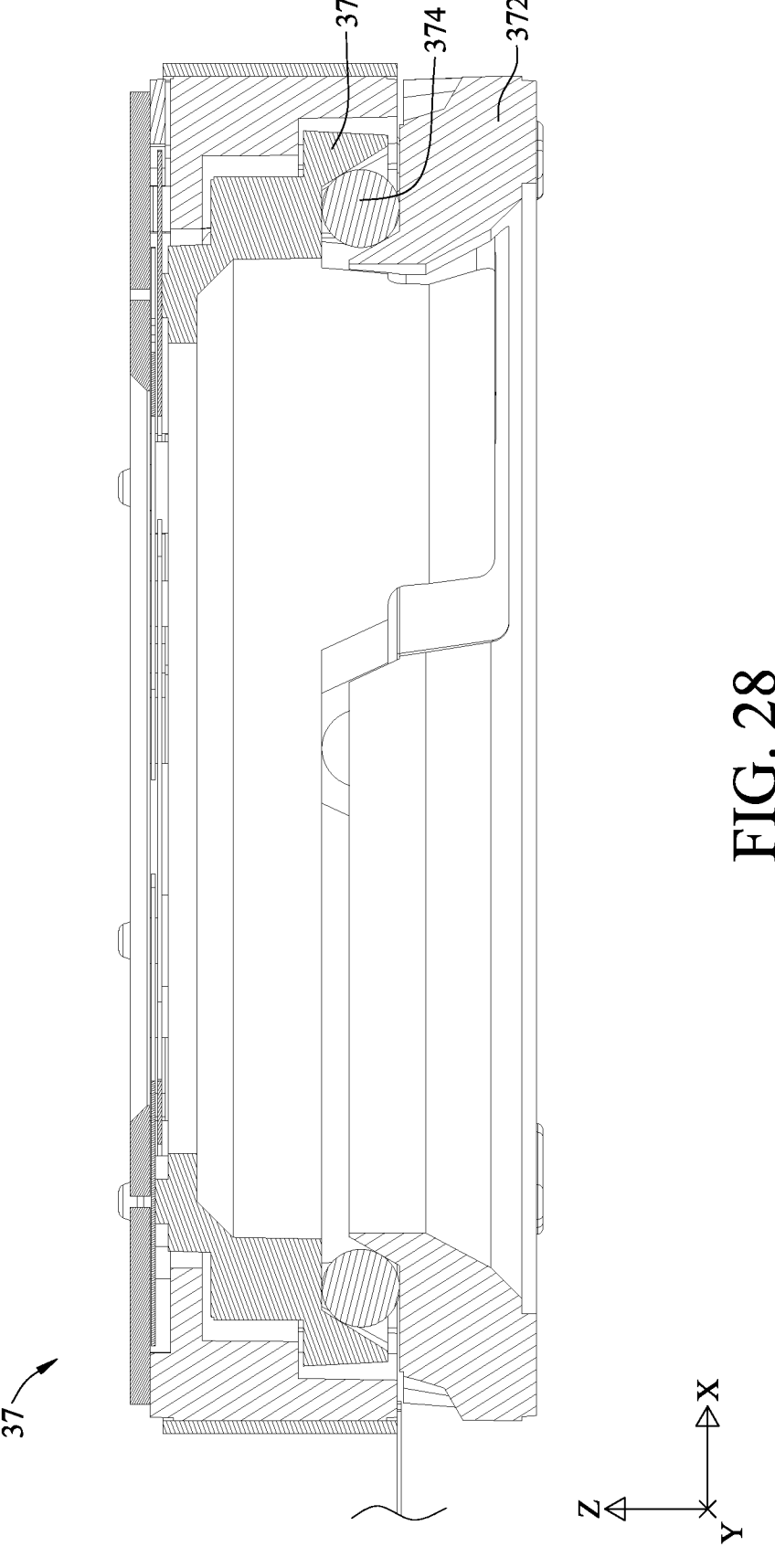
FIG. 28 is a partial and cross-sectional view of the variable through hole module and the wiring assembly in FIG. 26 along line 28-28.
Figure 29:
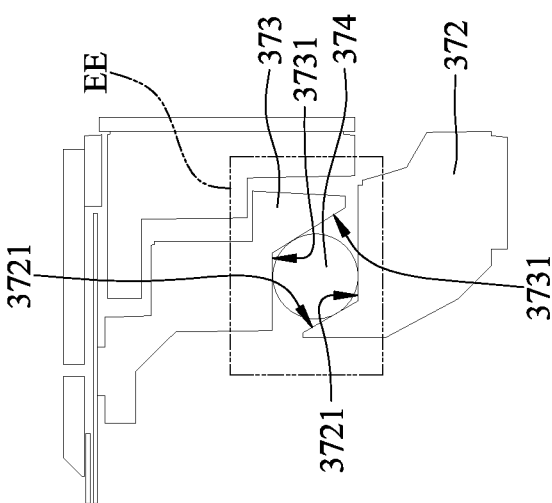
FIG. 29 is a cross-sectional view only schematically showing a partial contour of the variable through hole module in FIG. 28.
Figure 29:
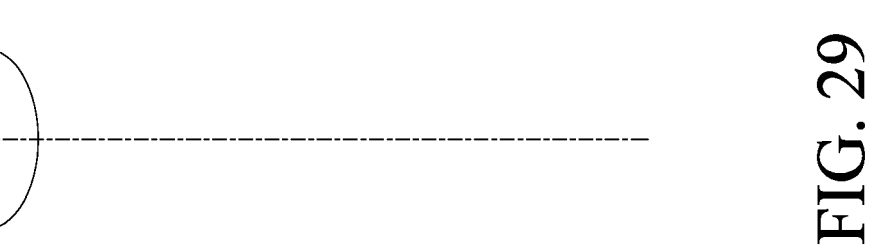
Figure 29:
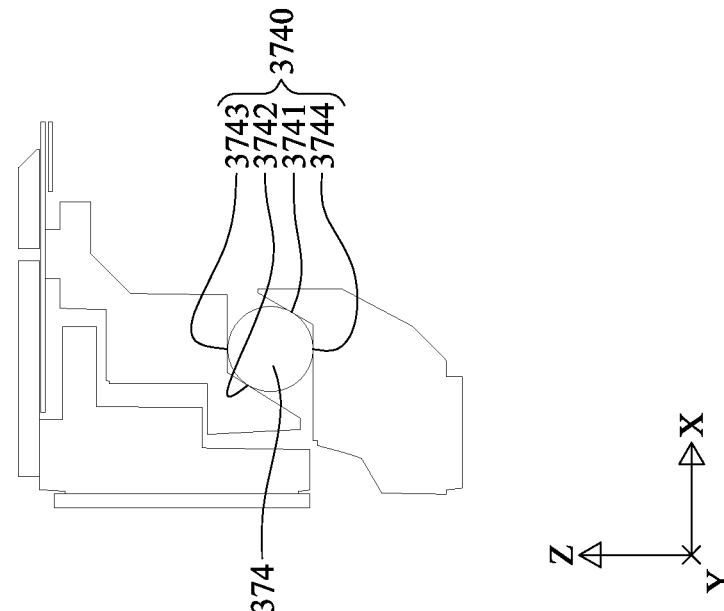
Figure 30:
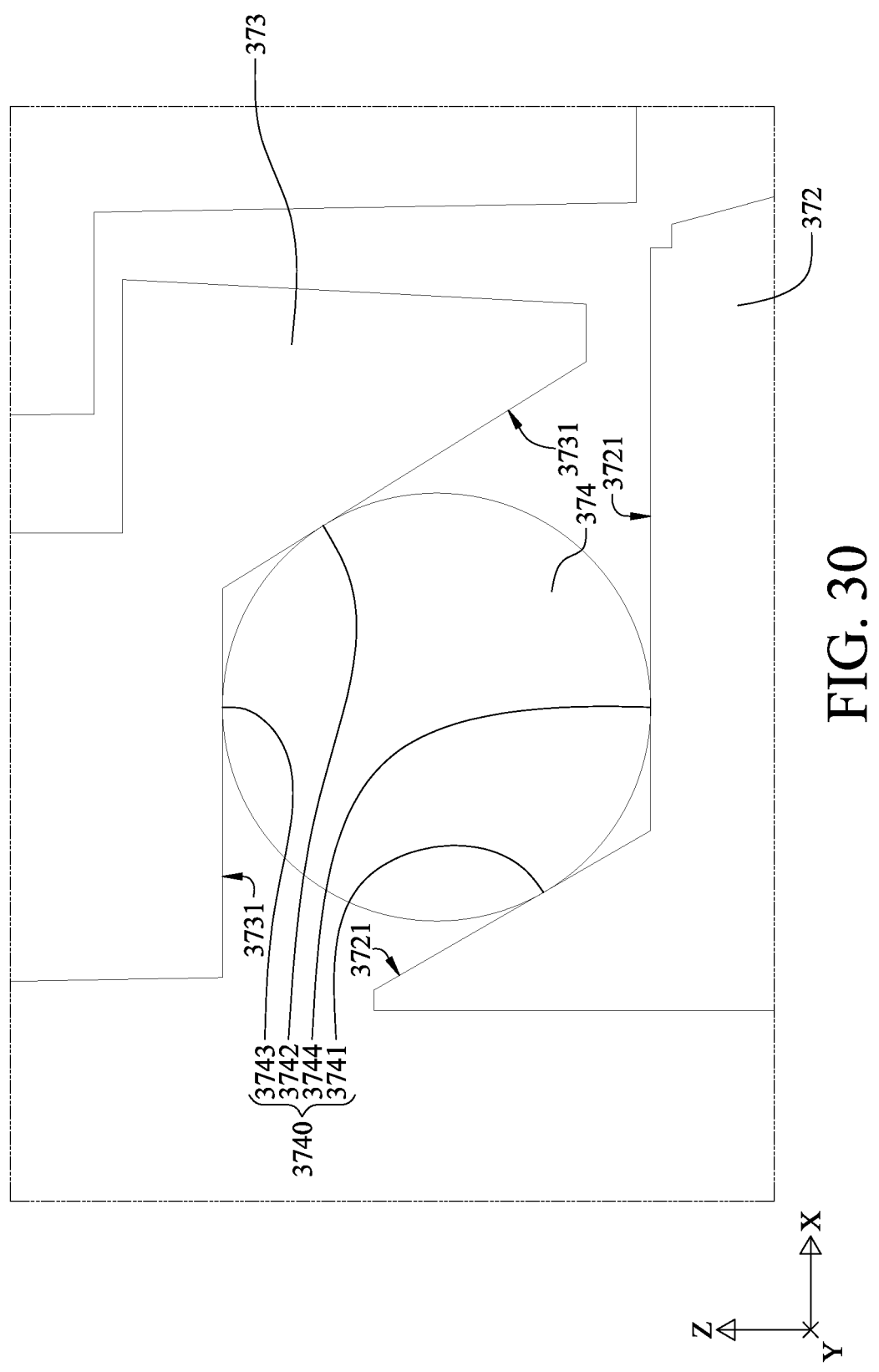
FIG. 30 is an enlarged view of EE region of the partial contour of the variable through hole module in FIG. 29.

Please refer to FIG. 20 to FIG. 30, where FIG. 20 is a perspective view of an imaging lens module according to the 3rd embodiment of the present disclosure, FIG. 21 is a perspective view of the imaging lens module in FIG. 20 that has been partially sectioned, FIG. 22 is another perspective view of a casing, a variable through hole module and a wiring assembly of the imaging lens module in FIG. 21, FIG. 23 is an exploded view of the variable through hole module and the wiring assembly of the imaging lens module in FIG. 20, FIG. 24 is an enlarged view of DD region of the imaging lens module in FIG. 20, FIG. 25 is a top view of the imaging lens module in FIG. 20, FIG. 26 is a top view of the variable through hole module and the wiring assembly of the imaging lens module in FIG. 25, FIG. 27 is a perspective view of the variable through hole module and the wiring assembly in FIG. 26 that have been sectioned along line 27-27, FIG. 28 is a partial and cross-sectional view of the variable through hole module and the wiring assembly in FIG. 26 along line 28-28, FIG. 29 is a cross-sectional view only schematically showing a partial contour of the variable through hole module in FIG. 28, and FIG. 30 is an enlarged view of EE region of the partial contour of the variable through hole module in FIG. 29.

An imaging lens module 3 provided in this embodiment includes a base 31, a casing 32, an imaging lens 33, a lens carrier (not numbered), an elastic element (not numbered), a frame (not numbered), a variable through hole module 37, two sets of wiring assemblies 38, an electrical connection element 39 and an image sensor IS.

The casing 32 is coupled to the base 31 to form an accommodation space (not numbered) therebetween. The casing 32 has an opening 320 exposing the accommodation space.

The imaging lens 33 is disposed to the casing 32, and part of the imaging lens 33 is exposed by the opening 320 of the casing 32. Specifically, the imaging lens 33 has an image part (not numbered) disposed in the accommodation space and an object part (not numbered) exposed to the outside by the opening 320 of the casing 32. The imaging lens 33 includes a plurality of optical lens elements 331 for receiving incident light passing through the opening 320, and the imaging lens module 3 has an optical axis 30 passing through the optical lens elements 331. Please be noted that the shape of the optical lens elements 331 illustrated in the drawings is not intended to restrict the present disclosure, and the optical lens elements 331 may be only schematically illustrated for simplicity.

The lens carrier supports the imaging lens 33. The elastic element has flexibility. The elastic element is connected to the lens carrier to provide the lens carrier with a translational degree of freedom along a direction parallel to the optical axis 30. The frame is connected to the elastic element, such that the lens carrier is movable along the direction parallel to the optical axis 30 with respect to the frame.

The variable through hole module 37 is coupled to the imaging lens 33, the variable through hole module 37 and the imaging lens 33 have no relative displacement with respect to each other, and the optical axis 30 passes through the center of the variable through hole module 37. The variable through hole module 37 has a light passable hole 370, and the light passable hole 370 has a variable aperture size.

Specifically, the variable through hole module 37 includes a light-blocking blade assembly 371, a fixed element 372, a movable element 373, four rollable supporters 374 and one set of driving mechanisms 375, as shown in FIG. 23.

The light-blocking blade assembly 371 includes a plurality of light-blocking blades 3711 that are arranged along a circumferential direction CM surrounding the optical axis 30 and at least partially overlap with each other so as to form the abovementioned light passable hole 370 with the variable aperture size.

The fixed element 372 is coupled to the imaging lens 33 and includes a first guide structure 3721. The movable element 373 is connected to the light-blocking blade assembly 371 and has a second guide structure 3731. The rollable supporters 374 are disposed between the fixed element 372 and the movable element 373 to provide the movable element 373 with a rotational degree of freedom along the circumferential direction CM surrounding the optical axis 30.

The rollable supporters 374 are in physical contact with the first guide structure 3721 and the second guide structure 3731. Each rollable supporter 374 has a plurality of contact points 3740. The contact points 3740 has an inner contact point 3741, an outer contact point 3742, an upper contact point 3743 and a lower contact point 3744. The inner contact point 3741 is located closer to the optical axis 30 than the other contact points. The outer contact point 3742 is located farther away from the optical axis 30 than the other contact points. The upper contact point 3743 is one of two contact points that are most spaced apart from each other in a direction parallel to the optical axis 30 among the contact points 3740. The lower contact point 3744 is the other one of the two contact points that are most spaced apart from each other in the direction parallel to the optical axis 30 among the contact points 3740.

Please be noted that FIG. 29 and FIG. 30 are schematically illustrated for better showing the physical contact relationship between the rollable supporter 374 and the first guide structure 3721 as well as the second guide structure 3731, and the contour of the variable through hole module 37 may not in compliance with the actual production. Moreover, the first guide structure 3721 and the second guide structure 3731 may have different types in structure so as to have different physical contact manners with the rollable supporter 374. For the different physical contact manners between the rollable supporter 374 and the first guide structure 3721 as well as the second guide structure 3731, please refer to the description relating to FIG. 13 to FIG. 16 above, which will not repeated in this embodiment.

The driving mechanism 375 is able to rotate the movable element 373 along the circumferential direction CM and to drive the light-blocking blade assembly 371 for adjusting the variable aperture size of the light passable hole 370.

The wiring assemblies 38 are electrically connected to the variable through hole module 37. When a maximum height of the wiring assemblies 38 along a direction parallel to the optical axis 30 is Hw, and a maximum height of the casing 32 along a direction parallel to the optical axis 30 is Hc, the following condition is satisfied: Hw<Hc, as shown in FIG. 21.

As shown in FIG. 25, when the imaging lens module 3 is observed along a direction from an object side of the imaging lens 33 to an image side of the imaging lens 33, at least part of the wiring assemblies 38 is exposed by the casing 32, and whole of each elastic element 35 is covered by the casing 32.

Specifically, each wiring assembly 38 includes a fixed wiring part 381 and a movable wiring part 382. The fixed wiring part 381 is disposed at the outer side of the casing 32 and is at least partially located closer to the opening 320 of the casing 32 than the elastic element 35. The movable wiring part 382 has flexibility and is curved, as shown in FIG. 24. The movable wiring part 382 is electrically connected to the fixed wiring part 381 and the variable through hole module 37. Moreover, as shown in FIG. 24, the variable through hole module 37 has a plurality of first electrical connection terminals 376, and the fixed wiring part 381 has a plurality of second electrical connection terminals 3811. The first electrical connection terminals 376 and the second electrical connection terminals 3811 are orthogonal to each other, and the movable wiring part 382 with conductivity is connected to and located between the first electrical connection terminals 376 and the second electrical connection terminals 3811 so as to achieve the electrical connection between the variable through hole module 37 and the fixed wiring part 381. Further, the flexibility of the movable wiring part 382 is able to reducing interference with the electrical signal transmission during relative displacement between the variable through hole module 37 and the fixed wiring part 381.

The electrical connection element 39 is disposed corresponding to the base 31. And, as shown in FIG. 20 and FIG. 21, the electrical connection element 39 is electrically connected to the fixed wiring parts 381 of the wiring assemblies 38. The image sensor IS is disposed at the image side of the imaging lens 33 and is electrically connected to the electrical connection element 39.

4th Embodiment

Figure 31:
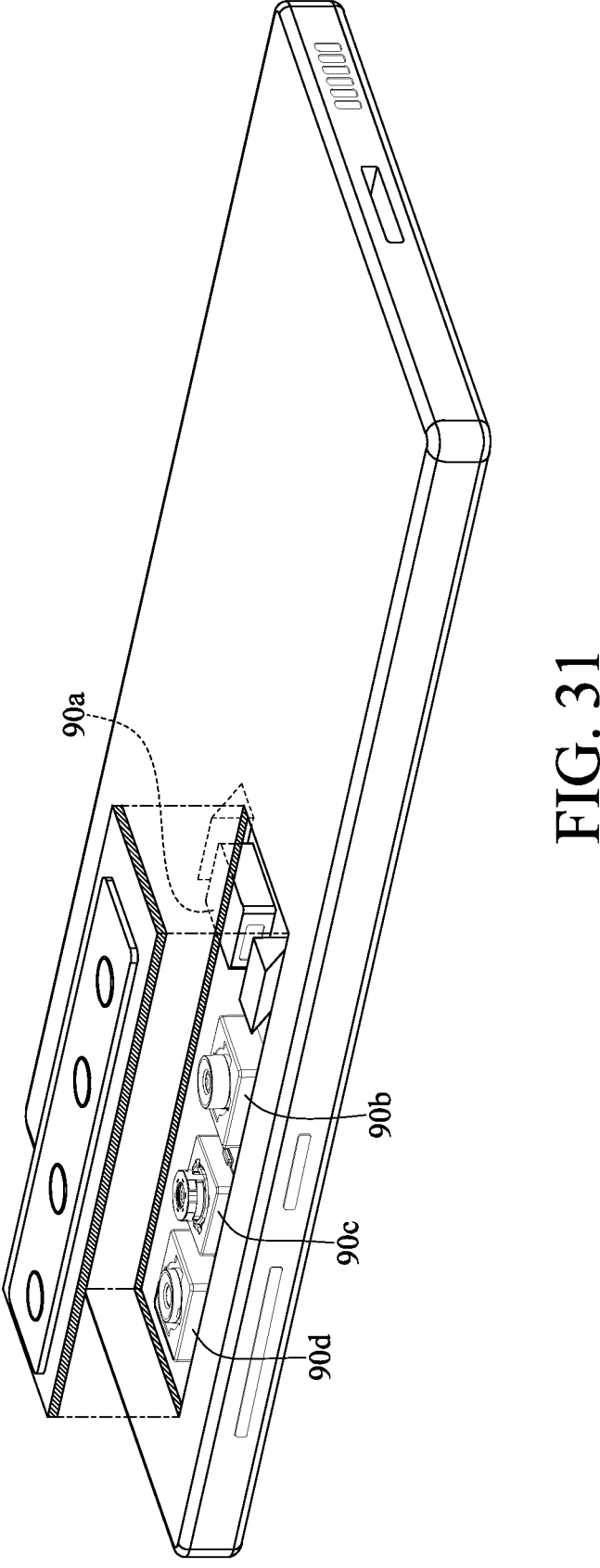
FIG. 31 is an exploded view of an electronic device according to the 4th embodiment of the present disclosure.

Please refer to FIG. 31, which is an exploded view of an electronic device according to the 4th embodiment of the present disclosure.

An electronic device 9 provided in this embodiment is a smartphone including a camera module 90a, a camera module 90b, a camera module 90c, a camera module 90d, a flash module, a focus assist module, an image signal processor, a display module and an image software processor (not shown). The camera module 90a, the camera module 90b, the camera module 90c, and the camera module 90d are disposed on the same side of the electronic device 9, while the display module is disposed on the opposite side of the electronic device 9. Moreover, the camera module 90c includes the imaging lens module 1 disclosed in the 1st embodiment and electronic components (not shown) for transmitting an imaging electrical signal output from the imaging lens module 1. However, the present disclosure is not limited thereto. The camera module 90c may include the imaging lens module disclosed in any one of the abovementioned embodiments and electronic component for transmitting an imaging electrical signal output therefrom.

The camera module 90a is an ultra-telephoto lens, the camera module 90b is a telephoto lens, the camera module 90c is a wide-angle main lens, and the camera module 90d is an ultra-wide-angle lens. The camera module 90a may have a field of view ranging from 5 degrees to 30 degrees, the camera module 90b may have a field of view ranging from 30 degrees to 60 degrees, the camera module 90c may have a field of view ranging from 65 degrees to 90 degrees, and the camera module 90d may have a field of view ranging from 93 degrees to 175 degrees. In this embodiment, the camera modules 90a, 90b, 90c and 90d have different fields of view, such that the electronic device 9 can have various magnification ratios so as to meet the requirement of optical zoom functionality. Moreover, the camera module 90a is an ultra-telephoto lens having a reflective element, which is favorable for thinness of the electronic device 9. In this embodiment, the electronic device 9 includes multiple camera modules 90a, 90b, 90c and 90d, but the present disclosure is not limited to the number and arrangement of camera modules.

When a user captures images of an object, the light rays converge in the camera module 90a, the camera module 90b, the camera module 90c or the camera module 90d to generate images, and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can include a touch screen or a physical button. The image software processor having multiple functions to capture images and complete image processing, and the image processed by the image software processor can be displayed on the display module.

Please be noted that a lens cover of the electronic device 9 shown in FIG. 31 being spaced apart from the main body thereof is only for better showing the imaging lens modules inside the electronic device 9. It doesn't mean the lens cover have to be removable, and the present disclosure is not limited thereto.

The smartphone in these embodiments is only exemplary for showing the imaging lens module and the camera module of the present disclosure installed in the electronic device 9, and the present disclosure is not limited thereto. The imaging lens module and the camera module of the present disclosure can be optionally applied to optical systems with a movable focus. Furthermore, the imaging lens module and the camera module of the present disclosure feature good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, having an optical axis, and the imaging lens module comprising:
   a casing, having an opening;
   an imaging lens, disposed to the casing, wherein part of the imaging lens is exposed by the opening of the casing, the imaging lens includes a plurality of optical lens elements, and the optical axis passes through the plurality of optical lens elements;
   a lens carrier, supporting the imaging lens;
   an elastic element, connected to the lens carrier to provide the lens carrier with a translational degree of freedom along a direction parallel to the optical axis;

a frame, connected to the elastic element, such that the lens carrier is movable along the direction parallel to the optical axis with respect to the frame;
   a variable through hole module, coupled to the imaging lens, wherein the optical axis passes through a center of the variable through hole module, the variable through hole module has a light passable hole, and the light passable hole has a variable aperture size; and
   a wiring assembly, electrically connected to the variable through hole module, and the wiring assembly comprising:
      a fixed wiring part, at least partially located closer to the opening of the casing than the elastic element; and
      a movable wiring part, electrically connected to the fixed wiring part and the variable through hole module;
   wherein the variable through hole module has a first electrical connection terminal, and the fixed wiring part has a second electrical connection terminal;
   wherein a maximum height of the wiring assembly along a direction parallel to the optical axis is Hw, a maximum height of the casing along a direction parallel to the optical axis is Hc, and the following condition is satisfied:

$$Hw \geq Hc.$$

2. The imaging lens module according to claim 1, wherein the variable through hole module comprising:
   a light-blocking blade assembly, comprising at least two light-blocking blades, wherein the at least two light-blocking blades are arranged along a circumferential direction surrounding the optical axis and at least partially overlap with each other so as to form the light passable hole;
   a fixed element, coupled to the imaging lens, wherein the fixed element has a first guide structure;
   a movable element, connected to the light-blocking blade assembly, wherein the movable element has a second guide structure;
   a rollable supporter, disposed between the fixed element and the movable element to provide the movable element with a rotational degree of freedom along the circumferential direction surrounding the optical axis; and
   a driving mechanism, configured to rotate the movable element along the circumferential direction and to drive the light-blocking blade assembly for adjusting the variable aperture size of the light passable hole.

3. The imaging lens module according to claim 2, wherein the rollable supporter is in physical contact with the first guide structure and the second guide structure.

4. The imaging lens module according to claim 3, wherein a number of the rollable supporter is five or less.

5. The imaging lens module according to claim 3, wherein the rollable supporter has a plurality of contact points, and the plurality of contact points have:
   an inner contact point, located closer to the optical axis than other contact points of the plurality of contact points;
   an outer contact point, located farther away from the optical axis than other contact points of the plurality of contact points;
   an upper contact point, being one of two contact points that are most spaced apart from each other in a direction parallel to the optical axis among the plurality of contact points; and a lower contact point, being another one of the two contact points that are most spaced apart from each other in the direction parallel to the optical axis among the plurality of contact points.

6. The imaging lens module according to claim 5, wherein a distance perpendicular to the optical axis between the inner contact point and the lower contact point among the plurality of contact points is Di, a distance perpendicular to the optical axis between the inner contact point and the outer contact point among the plurality of contact points is Dt, and the following condition is satisfied:

$$0.3 \leq Di/Dt \leq 0.9.$$

7. The imaging lens module according to claim 3, wherein the rollable supporter has a plurality of contact points, and the plurality of contact points have:

an inner contact point, located closer to the optical axis than other contact points of the plurality of contact points;

an outer contact point, located farther away from the optical axis than other contact points of the plurality of contact points;

an upper contact point, being one of two contact points that are most spaced apart from each other in a direction parallel to the optical axis among the plurality of contact points; and a lower contact point, being another one of the two contact points that are most spaced apart from each other in the direction parallel to the optical axis among the plurality of contact points;

wherein one of the inner contact point and the outer contact point and one of the upper contact point and the lower contact point among the plurality of contact points are a same contact point.

8. The imaging lens module according to claim 7, wherein a distance perpendicular to the optical axis between the inner contact point and the lower contact point among the plurality of contact points is Di, a distance perpendicular to the optical axis between the inner contact point and the outer contact point among the plurality of contact points is Dt, and the following condition is satisfied:

$$0.3 \leq Di/Dt \leq 0.9.$$

9. The imaging lens module according to claim 1, further comprising:

a base, coupled to the casing;

an electrical connection element, disposed corresponding to the base; and an image sensor, disposed at an image side of the imaging lens, wherein the image sensor is electrically connected to the electrical connection element.

10. The imaging lens module according to claim 1, wherein the first electrical connection terminal and the second electrical connection terminal are orthogonal to each other.

11. The imaging lens module according to claim 9, wherein the wiring assembly is further electrically connected to the electrical connection element.

12. The imaging lens module according to claim 1, wherein the imaging lens and the variable through hole module have no relative displacement with respect to each other.

13. The imaging lens module according to claim 1, wherein when the imaging lens module is observed along a direction from an object side of the imaging lens to an image side of the imaging lens, the wiring assembly is exposed by the casing, and whole of the elastic element is covered by the casing.

14. The imaging lens module according to claim 2, wherein the light-blocking blade assembly is made of plastic material.

15. A camera module, comprising:

the imaging lens module of claim 9.

16. An electronic device, comprising:

the camera module of claim 15.

17. An imaging lens module, having an optical axis, and the imaging lens module comprising:

a casing, having an opening;

an imaging lens, disposed to the casing, wherein part of the imaging lens is exposed by the opening of the casing, the imaging lens includes a plurality of optical lens elements, and the optical axis passes through the plurality of optical lens elements;

a lens carrier, supporting the imaging lens;

an elastic element, connected to the lens carrier to provide the lens carrier with a translational degree of freedom along a direction parallel to the optical axis;

a frame, connected to the elastic element, such that the lens carrier is movable along the direction parallel to the optical axis with respect to the frame;

a variable through hole module, coupled to the imaging lens, wherein the optical axis passes through a center of the variable through hole module, the variable through hole module has a light passable hole, and the light passable hole has a variable aperture size; and a wiring assembly, electrically connected to the variable through hole module, and the wiring assembly comprising:

a fixed wiring part, at least partially located closer to the opening of the casing than the elastic element; and a movable wiring part, electrically connected to the fixed wiring part and the variable through hole module;

wherein the variable through hole module has a first electrical connection terminal, and the fixed wiring part has a second electrical connection terminal;

wherein a maximum height of the wiring assembly along a direction parallel to the optical axis is Hw, a maximum height of the casing along a direction parallel to the optical axis is Hc, and the following condition is satisfied:

$$Hw < Hc.$$

18. The imaging lens module according to claim 17, wherein the variable through hole module comprising:

a light-blocking blade assembly, comprising at least two light-blocking blades, wherein the at least two light-blocking blades are arranged along a circumferential direction surrounding the optical axis and at least partially overlap with each other so as to form the light passable hole;

a fixed element, coupled to the imaging lens, wherein the fixed element has a first guide structure;

a movable element, connected to the light-blocking blade assembly, wherein the movable element has a second guide structure;

a rollable supporter, disposed between the fixed element and the movable element to provide the movable element with a rotational degree of freedom along the circumferential direction surrounding the optical axis; and a driving mechanism, configured to rotate the movable element along the circumferential direction and to drive the light-blocking blade assembly for adjusting the variable aperture size of the light passable hole.

19. The imaging lens module according to claim 18, wherein the rollable supporter is in physical contact with the first guide structure and the second guide structure.

20. The imaging lens module according to claim 19, wherein a number of the rollable supporter is five or less.

21. The imaging lens module according to claim 19, wherein the rollable supporter has a plurality of contact points, and the plurality of contact points have:

an inner contact point, located closer to the optical axis than other contact points of the plurality of contact points;

an outer contact point, located farther away from the optical axis than other contact points of the plurality of contact points;

an upper contact point, being one of two contact points that are most spaced apart from each other in a direction parallel to the optical axis among the plurality of contact points; and a lower contact point, being another one of the two contact points that are most spaced apart from each other in the direction parallel to the optical axis among the plurality of contact points.

22. The imaging lens module according to claim 21, wherein a distance perpendicular to the optical axis between the inner contact point and the lower contact point among the plurality of contact points is Di, a distance perpendicular to the optical axis between the inner contact point and the outer contact point among the plurality of contact points is Dt, and the following condition is satisfied:

$$0.3 \leq Di/Dt \leq 0.9.$$

23. The imaging lens module according to claim 19, wherein the rollable supporter has a plurality of contact points, and the plurality of contact points have:

an inner contact point, located closer to the optical axis than other contact points of the plurality of contact points;

an outer contact point, located farther away from the optical axis than other contact points of the plurality of contact points;

an upper contact point, being one of two contact points that are most spaced apart from each other in a direction parallel to the optical axis among the plurality of contact points; and a lower contact point, being another one of the two contact points that are most spaced apart from each other in the direction parallel to the optical axis among the plurality of contact points;

wherein one of the inner contact point and the outer contact point and one of the upper contact point and the lower contact point among the plurality of contact points are a same contact point.

24. The imaging lens module according to claim 23, wherein a distance perpendicular to the optical axis between the inner contact point and the lower contact point among the plurality of contact points is Di, a distance perpendicular to the optical axis between the inner contact point and the outer contact point among the plurality of contact points is Dt, and the following condition is satisfied:

$$0.3 \leq Di/Dt \leq 0.9.$$

25. The imaging lens module according to claim 17, wherein the first electrical connection terminal and the second electrical connection terminal are orthogonal to each other.

26. The imaging lens module according to claim 17, wherein the imaging lens and the variable through hole module have no relative displacement with respect to each other.

27. The imaging lens module according to claim 17, wherein when the imaging lens module is observed along a direction from an object side of the imaging lens to an image side of the imaging lens, the wiring assembly is exposed by the casing, and whole of the elastic element is covered by the casing.

28. A camera module, comprising:
the imaging lens module of claim 17.

29. An electronic device, comprising:
the camera module of claim 28; and
an image sensor, disposed at an image side of the imaging lens.

* * * * *